US012656550B2

(12) United States Patent
Morishima et al.

(10) Patent No.: US 12,656,550 B2
(45) Date of Patent: Jun. 16, 2026

(54) OPTICAL FIBER ALIGNMENT METHOD, ALIGNMENT DEVICE, AND CONNECTION DEVICE

(71) Applicant: SUMITOMO ELECTRIC INDUSTRIES, LTD., Osaka (JP)

(72) Inventors: Tetsu Morishima, Osaka (JP); Shintaro Mouri, Osaka (JP); Soichi Endo, Osaka (JP); Akinori Kimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 352 days.

(21) Appl. No.: 18/686,574

(22) PCT Filed: Jul. 21, 2022

(86) PCT No.: PCT/JP2022/028339
§ 371 (c)(1),
(2) Date: Feb. 26, 2024

(87) PCT Pub. No.: WO2023/032506
PCT Pub. Date: Mar. 9, 2023

(65) Prior Publication Data
US 2024/0369768 A1 Nov. 7, 2024

(30) Foreign Application Priority Data

Aug. 30, 2021 (JP) ................................. 2021-140350

(51) Int. Cl.
*G02B 6/255* (2006.01)
(52) U.S. Cl.
CPC ................................. *G02B 6/2555* (2013.01)

(58) Field of Classification Search
CPC .... G02B 6/2555; G02B 6/02; G02B 6/02042; G02B 6/24; G02B 6/26; G02B 6/255;
(Continued)

(56) References Cited

U.S. PATENT DOCUMENTS

| | | | |
|---|---|---|---|
| 12,487,405 B2 * | 12/2025 | Kremp | ................. G02B 6/2555 |
| 2015/0055923 A1 | 2/2015 | Saito et al. | |
| 2019/0113682 A1 | 4/2019 | Sakuma et al. | |

FOREIGN PATENT DOCUMENTS

| | | |
|---|---|---|
| CN | 105911647 A | 8/2016 |
| JP | H03-230105 A | 10/1991 |

(Continued)

OTHER PUBLICATIONS

International Search Report issued in Patent Application No. PCT/JP2022/028339 dated Sep. 6, 2022.

(Continued)

*Primary Examiner* — John Bedtelyon
(74) *Attorney, Agent, or Firm* — McDonald Hopkins LLC

(57) ABSTRACT

One embodiment of the present disclosure relates to an optical fiber alignment method that enables highly accurate alignment of an optical fiber without applying a complicated driving system. The alignment method includes finely aligning the first and second optical fibers and finely aligning. Roughly aligning the first and second optical fibers based on a result of end-surface observation. Finely aligning the first and second optical fibers based on a result of side-surface observation in such a manner as to increase an optical coupling efficiency between each pair of the cores in the first and second optical fibers.

10 Claims, 11 Drawing Sheets

(58) Field of Classification Search
　　　CPC .. G02B 6/2556; G02B 6/3616; G02B 6/3624;
　　　　　　　　G02B 6/3648; G02B 6/3652; G02B
　　　　　　　　6/3656; G02B 6/366; G02B 6/3801;
　　　　　　　　　　G02B 6/3803; G02B 6/3805
　　　See application file for complete search history.

(56)　　　　　　　　　References Cited

FOREIGN PATENT DOCUMENTS

| | | |
|---|---|---|
| JP | 2004-012799 A | 1/2004 |
| JP | 2013-029758 A | 2/2013 |
| JP | 2013-050695 A | 3/2013 |
| JP | 5786528 B2 | 9/2015 |
| JP | 2019-159017 A | 9/2019 |
| JP | 2020-144301 A | 9/2020 |
| WO | 2017/217539 A1 | 12/2017 |

OTHER PUBLICATIONS

Written Opinion issued in Patent Application No. PCT/JP2022/
028339 dated Sep. 6, 2022.

\* cited by examiner

*Fig.1*

| TYPE | APPEARANCE (PARTLY INCLUDING CUTAWAY VIEW) | CROSS-SECTIONAL STRUCTURE |
|------|---------------------------------------------|---------------------------|
| MCF | | |
| BUNDLE FIBER | | |

*Fig.8*

OPTICAL FIBER ALIGNMENT METHOD, ALIGNMENT DEVICE, AND CONNECTION DEVICE

TECHNICAL FIELD

The present disclosure relates to an optical fiber alignment method, an alignment device and a connection device. This application claims priority based on Japanese Patent Application No. 2021-140350 filed on Aug. 30, 2021, and the entire contents of the Japanese patent application are incorporated herein by reference.

BACKGROUND ART

PTL 1 discloses a method for aligning two multi-core optical fibers (hereinafter referred to as "MCF") to be optically connected (see paragraphs 0069 and 0070 and FIG. 8). Specifically, a mirror is disposed in a space sandwiched between end surfaces of two MCFs. The mirror has two reflection surfaces inclined at about 45° with respect to central axes (fiber axes) of the two MCFs, and end surface images of the two MCFs are reflected to a monitor. An arrangement of elements constituting the end surface such as cores, a cladding, and markers is displayed on the monitor. Therefore, the two MCFs can be aligned by relatively rotating both or either of the two MCFs so that the positions of the elements in the correspondence relationship on the respective end surfaces coincide with each other. That is, a plurality of cores of one MCF and a plurality of cores of the other MCF can be optically connected to each other.

CITATION LIST

Patent Literatures

PTL 1: Japanese Unexamined Patent Application Publication No. 2013-050695
PTL 2: Japanese Unexamined Patent Application Publication No. 2004-12799

SUMMARY OF INVENTION

An optical fiber alignment method of the present disclosure is a method for selecting, as to-be-aligned objects, a first optical fiber and a second optical fiber, or selecting the second optical fiber as a to-be-aligned object and aligning the first and second optical fibers such that the first and second optical fibers are optically connected to each other, and the method includes roughly aligning and finely aligning. Here, the first optical fiber extends along a first central axis and includes a plurality of first cores arranged at predetermined positions on a first end surface perpendicular to the first central axis. The second optical fiber extends along a second central axis and includes a plurality of second cores arranged at positions on a second end surface perpendicular to the second central axis, the positions corresponding to the predetermined positions on the first end surface.

Roughly aligning is a step of roughly aligning the first and second optical fibers based on a result of end-surface observation performed on the first and second optical fibers, and includes primarily obtaining, measuring and primarily rotating. In the primarily obtaining, an end surface image of the first optical fiber and end surface image of the second optical fiber are obtained. In the measuring, from the end surface images of the first and second optical fibers, a dimension of at least each of the plurality of first and second cores and a position of a center of at least each of the plurality of first and second cores are measured as information relating to a first core arrangement formed of the plurality of first cores on the first end surface and information relating to a second core arrangement formed of the plurality of second cores on the second end surface. In primarily rotating, based on a result of the measuring, the to-be-aligned object is rotated along a circumferential direction around a central axis of the to-be-aligned object. On the other hand, finely aligning is a step of aligning the first and second optical fibers based on a result of side-surface observation performed on the first and second optical fibers in such a manner as to increase an optical coupling efficiency between each pair of the cores in the first and second optical fibers, which have been roughly aligned, the pair of cores being associated with each other, and includes secondarily obtaining and secondarily rotating. In the secondarily obtaining, a side surface image of the first and the second optical fiber are obtained. In the secondarily rotating, the to-be-aligned object is rotated along the circumferential direction around the central axis of the to-be-aligned object after checking an alignment state between the first and second optical fibers, which have been roughly aligned, from the side surface image.

Further, the rough alignment of the first and second optical fibers in the primarily rotating is performed under a first condition and a second condition. The first condition is defined in which both the first core arrangement and the second core arrangement have n-fold (n is two or more) rotational symmetry, and the second condition is defined in which neither the first core arrangement nor the second core arrangement has rotational symmetry. Roughly aligned such that, under the first condition, a first angle formed by an orientation indicated by a first line, the first line being defined on the first end surface and extending from a center of the first end surface in such a manner as to pass through the center of a specific one of the plurality of first cores, and an orientation indicated by a second line, the second line being defined on the second end surface and extending from a center of the second end surface in such a manner as to pass through the center of a specific one of the plurality of second cores that is associated with the specific first core is 360°/n or less. In addition, roughly aligned such that, under the second condition, a second angle formed by an orientation indicated by the first line and an orientation indicated by the second line is a minimum angle or less, the minimum angle being an angle other than zero. The minimum angle being an angle other than zero is selected from among angles formed by a plurality of first radial line elements defined on the first end surface and extending radially from the center of the first end surface in such a manner as to pass through the centers of the plurality of first cores or angles formed by a plurality of second radial line elements defined on the second end surface and extending radially from the center of the second end surface in such a manner as to pass through the centers of the plurality of second cores.

BRIEF DESCRIPTION OF DRAWINGS

FIG. 1 is a view showing appearances (partly including a cutaway view) and cross-sectional structures of various optical fibers that can be applied to an optical fiber alignment method and the like (including fixation of optical fibers, which have been aligned, and connection between optical fibers arranged to face each other) according to the present disclosure.

FIG. 8 is a view for explaining a rotational alignment accuracy in a rough alignment step and a fine alignment step as various examples of an alignment operation between two MCFs in which each core arrangement has rotational symmetry.

DETAILED DESCRIPTION

Figure 2:
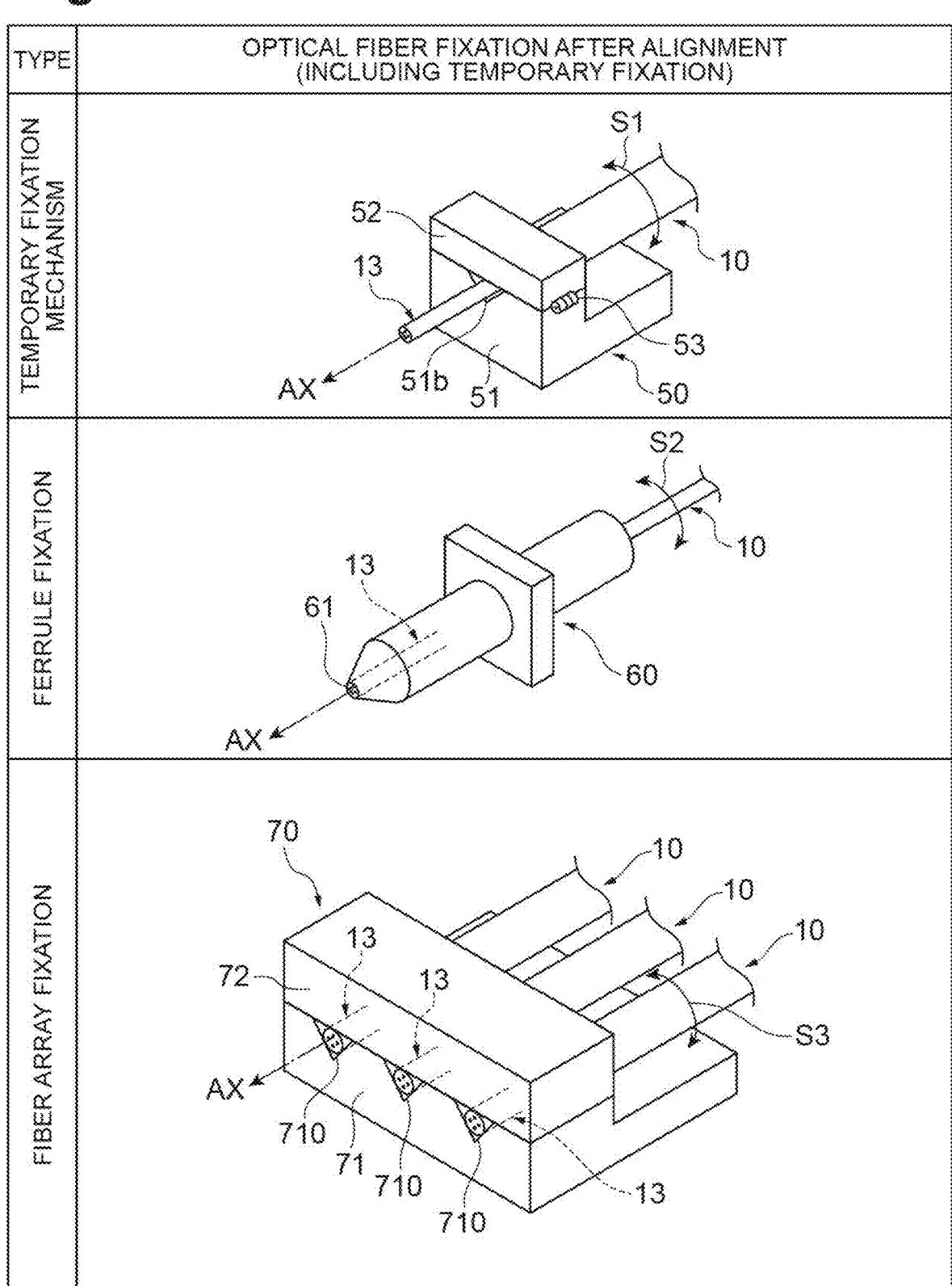
FIG. 2 is a view showing various configuration examples of fixation jigs (included in a connection device of the present disclosure) for fixing (including temporary fixation) an optical fiber, which have been aligned.

Problems to be solved by Present Disclosure

As a result of studies on the above-described prior arts, inventors have found following problems. That is, in order to perform the conventional alignment method disclosed in PTL 1, a complicated driving system is required. For example, there was a problem that, in order to realize high alignment accuracy, it is necessary to dispose a drivable mirror for end-surface observation, and also a high-accuracy fiber driving system (a driving system for moving and rotating an optical fiber of a to-be-aligned object) capable of abutting end surfaces of two MCFs subjected to position adjustment (alignment) of a plurality of elements (cores, claddings, markers, and the like) constituting the end surfaces by end-surface observation so that the adjusted element positions are not deviated is required.

The object of the present disclosure is to provide an optical fiber alignment method, an alignment device and a connection device, having a structure for enabling highly accurate alignment of an optical fiber without applying a complicated driving system to solve the above problems.

Advantageous Effects of Present Disclosure

According to the optical fiber alignment method of the present disclosure, highly accurate alignment of the optical fiber can be performed without applying a complicated driving system by a combination of a rough alignment operation by end-surface observation and a fine alignment operation by side observation.

Description of Embodiments of Present Disclosure

First, each of the embodiments of the present disclosure will be individually listed and described.

(1) An optical fiber alignment method of the present disclosure is a method for selecting, as to-be-aligned objects, a first optical fiber and a second optical fiber, or selecting the second optical fiber as a to-be-aligned object and aligning the first and second optical fibers such that the first and second optical fibers are optically connected to each other, and the method includes roughly aligning and finely aligning. Here, the first optical fiber extends along a first central axis and includes a plurality of first cores arranged at predetermined positions on a first end surface perpendicular to the first central axis. The second optical fiber extends along a second central axis and includes a plurality of second cores arranged at positions on a second end surface perpendicular to the second central axis, the positions corresponding to the predetermined positions on the first end surface. Roughly aligning is a step of roughly aligning the first and second optical fibers based on a result of end-surface observation performed on the first and second optical fibers, and includes primarily obtaining, measuring and primarily rotating. In the primarily obtaining, an end surface image of the first optical fiber and end surface image of the second optical fiber are obtained. In the measuring, from the end surface images of the first and second optical fibers, a dimension of at least each of the plurality of first and second cores and a position of a center of at least each of the plurality of first and second cores are measured as information relating to a first core arrangement formed of the plurality of first cores on the first end surface and information relating to a second core arrangement formed of the plurality of second cores on the second end surface. In primarily rotating, based on a result of the measuring, the to-be-aligned object is rotated along a circumferential direction around a central axis of the to-be-aligned object. On the other hand, finely aligning is a step of aligning the first and second optical fibers based on a result of side-surface observation performed on the first and second optical fibers in such a manner as to increase an optical coupling efficiency between each pair of the cores in the first and second optical fibers, which have been roughly aligned, the pair of cores being associated with each other, and includes secondarily obtaining and secondarily rotating. In the secondarily obtaining, a side surface image of the first and the second optical fiber are obtained. In the secondarily rotating, the to-be-aligned object is rotated along the circumferential direction around the central axis of the to-be-aligned object after checking an alignment state between the first and second optical fibers, which have been roughly aligned, from the side surface image. Further, the rough alignment of the first and second optical fibers in the primarily rotating is performed under a first condition and a second condition. It is noted that the rough alignment under the first condition and the rough alignment under the second condition can be performed by a common device configuration. The first condition is defined in which both the first core arrangement and the second core arrangement have n-fold (n is two or more) rotational symmetry, and the second condition is defined in which neither the first core arrangement nor the second core arrangement has rotational symmetry. Roughly aligned such that, under the first condition, a first angle formed by an orientation indicated by a first line, the first line being defined on the first end surface and extending from a center of the first end surface in such a manner as to pass through the center of a specific one of the plurality of first cores, and an orientation indicated by a second line, the second line being defined on the second end surface and extending from a center of the second end surface in such a manner as to pass through the center of a specific one of the plurality of second cores that is associated with the specific first core is 360°/n or less. In addition, roughly aligned such that, under the second condition, a second angle formed by an orientation indicated by the first line and an orientation indicated by the second line is a minimum angle or less, the minimum angle being an angle other than zero. The minimum angle being an angle other than zero is selected from among angles formed by a plurality of first radial line elements defined on the first end surface and extending radially from the center of the first end surface in such a manner as to pass through the centers of the plurality of first cores or angles formed by a plurality of second radial line elements defined on the second end surface and extending radially from the center of the second end surface in such a manner as to pass through the centers of the plurality of second cores. As described above, according to the optical fiber alignment method of the present disclosure, highly accurate alignment of optical fibers can be performed without applying a complicated driving system by a combination of a rough alignment operation by end-surface observation in a state where two optical fibers are separated by a predetermined distance and a fine alignment operation by side observation in a state where the end surfaces of the two optical fibers are arranged close to each other. That is, by combining two types of alignment operations, it is possible to compensate for a decrease in alignment accuracy caused by rotation of the optical fiber in each alignment operation or movement of the optical fiber between alignment operations (suppression of an alignment error caused by a driving system).

(2) In the above (1), the alignment method may further include: moving, before the finely aligning, at least the second optical fiber, which has been roughly aligned, of first and second optical fibers, which have been roughly aligned, along the second central axis such that a gap between the first end surface of the first optical fiber, which has been roughly aligned, and the second end surface of the second optical fiber, which has been roughly aligned, is reduced. By bringing tip parts of the first and second optical fibers closer together, the finely aligning by side-surface observation is facilitated.

(3) In (1) or (2) above, in both the roughly aligning and the finely aligning or in either the roughly aligning or the finely aligning, the first core arrangement on the end surface of the first optical fiber may be fixed as an alignment target. As described above, by setting one of the first and second optical fibers to be optically connected as the alignment target, it is possible to suppress the alignment error caused by the driving system.

(4) In any one of (1) to (3) above, in the measuring, a measurement of a rotation period is performed and rotational alignment in the secondarily rotating is performed by rotating the to-be-aligned object at a rotation angle that is the first angle after the primarily rotating or less or the second angle after the primarily rotating or less. Here, "rotation period" is angle information representing rotational symmetry of a core arrangement formed of a plurality of cores on the end surface of each optical fiber, and is the rotation angle when the position of the core before rotation and the position of the core after rotation first overlap when the end surface image is rotated around the central axis. For example, when the core arrangement on the end surface has n (≥2)-fold rotational symmetry with respect to the center of the end surface, the rotation period is given by 360°/n. It is noted that, since all the plan view shapes return to the original state (plan view shape before rotation) by rotating by 360°, n=1 is not regarded as rotational symmetry. According to the above configuration, it is possible to avoid excessive rotation in the secondarily rotating and to perform efficient alignment.

(5) In any one of (1) to (3) above, the first optical fiber may include a first marker extending along the first central axis, and the second optical fiber may include a second marker extending along the second central axis. In this case, in the primarily rotating, the to-be-aligned object may be rotated to a position where the side surface image in which one of the plurality of first cores and the first marker overlap each other and in which one of the plurality of second cores and the second marker overlap each other is obtained in the secondarily obtaining. According to this configuration, even when the marker cannot be observed at the time of a side observation, the marker can be inevitably matched by matching the core arrangement.

(6) In any one of (1) to (5) above, it is preferable that the first and second optical fibers have each a multi-core optical fiber or a bundle fiber. These optical fibers have an end surface formed of a plurality of elements (a plurality of cores and markers) in addition to cladding, and can serve as the to-be-aligned object in the alignment method of the present disclosure as optical fibers requiring alignment by rotation.

(7) An alignment device of the present disclosure performs the optical fiber alignment method defined in (1) to (6) above. That is, according to the alignment device, highly accurate alignment of the optical fiber can be performed without applying a complicated driving system. Specifically, the alignment device of the present disclosure includes a rough alignment unit and a fine alignment unit, selects, as to-be-aligned objects, a first optical fiber extending along a first central axis and including a plurality of first cores arranged at predetermined positions on a first end surface perpendicular to the first central axis and a second optical fiber extending along a second central axis and including a plurality of second cores arranged at positions on a second end surface perpendicular to the second central axis, the positions corresponding to the predetermined positions on the first end surface, or select the second optical fiber as a to-be-aligned object and configured to align the first and second optical fibers such that the first and second optical fibers are optically connected to each other. The rough alignment unit roughly aligns the first and second optical fibers based on a result of end-surface observation performed on the first and second optical fibers. The fine alignment unit finely aligns the first and second optical fibers based on a result of side-surface observation performed on the first and second optical fibers in such a manner as to increase an optical coupling efficiency between each pair of the cores in the first and second optical fibers, which have been roughly aligned by the rough alignment unit, the pair of cores being associated with each other. Here, the rough alignment unit includes a first image obtaining unit, a measurement unit and a first rotation unit. The first image obtaining unit obtains an end surface image of the first optical fiber and an end surface image of the second optical fiber. The measurement unit measures, from the end surface images of the first and second optical fibers, a dimension of each of the plurality of first and second cores and a position of a center of each of the plurality of first and second cores as information relating to a first core arrangement formed of the plurality of first cores on the first end surface and information relating to a second core arrangement formed of the plurality of second cores on the second end surface. The first rotation unit rotates, based on a measurement result obtained by the measurement unit, the to-be-aligned object along a circumferential direction around a central axis of the to-be-aligned object. In addition, the fine alignment unit includes a second image obtaining unit, and a second rotation unit. The second image obtaining unit obtains a side surface image of the first and second optical fibers. The second rotation unit checks an alignment state between the first and second optical fibers, which have been roughly aligned, from the side surface image and rotate the to-be-aligned object along the circumferential direction around the central axis of the to-be-aligned object. The first rotation unit of the rough alignment unit and the second rotation unit of the fine alignment unit may be configured by a common alignment mechanism, or may be configured by different alignment mechanisms. Especially, the first rotation unit rotates, under a first condition in which both the first core arrangement and the second core arrangement have n-fold (n is two or more) rotational symmetry, the first and second optical fibers such that a first angle formed by an orientation indicated by a first line, the first line being defined on the first end surface and extending from a center of the first end surface in such a manner as to pass through the center of a specific one of the plurality of first cores, and an orientation indicated by a second line, the second line being defined on the second end surface and extending from a center of the second end surface in such a manner as to pass through the center of a specific one of the plurality of second cores that is associated with the specific first core is 360°/n or less. In addition, the first rotation unit rotates, under a second condition in which neither the first core arrangement nor the second core arrangement has rotational symmetry, the first and second optical fibers such that a second angle formed by an orientation indicated by the first line and an orientation indicated by the second line is a minimum angle or less, the minimum angle being an angle other than zero among angles formed by a plurality of first radial line elements defined on the first end surface and extending radially from the center of the first end surface in such a manner as to pass through the centers of the plurality of first cores or angles formed by a plurality of second radial line elements defined on the second end surface and extending radially from the center of the second end surface in such a manner as to pass through the centers of the plurality of second cores.

(8) A connection device of the present disclosure may include a fusion device configured to heat and fuse the first and second optical fibers together in a state where the first end surface of the first optical fiber aligned by the alignment device defined in (7) above and the second end surface of the second optical fiber aligned by the alignment device defined in (7) above are abutted against each other in order to perform the optical fiber alignment method of the present disclosure defined in (1) to (6) above. In this case, a physical strength of a connection portion (including the end surface) between the optically connected first and second optical fibers is obtained.

(9) A connection device of the present disclosure may include the alignment device defined in (7) above in order to perform the optical fiber alignment method of the present disclosure defined in (1) to (6) above, and may further include a fixation jig configured to fix the first and second optical fibers in place in a state where the first end surface of the first optical fiber aligned by the alignment device defined in (7) above and the second end surface of the second optical fiber aligned by the alignment device defined in (7) above face each other. In addition, the fixation jig preferably includes any one of a temporary fixation mechanism for detachably holding the to-be-aligned object, a ferrule constituting a part of an optical connector mounted on a tip part of the to-be-aligned object including an end surface, and a fiber array on which tip parts of a plurality of optical fibers including the to-be-aligned object are mounted. This configuration is effective for aligning two optical fibers optically connected to each other. In addition, it is also effective to align facing array components (such as a fiber array) and bond them with an ultraviolet-ray-curing resin. In particular, since a temporary fixation jig can temporarily hold the alignment state of the first and second optical fibers, it is effective when the first and second optical fibers are heated and fused by the above-described fusion device.

(10) In the (9) above, the fixation jig may include a mechanical splice element. This configuration is also effective for aligning two optical fibers facing each other.

Details of Embodiments of Present Disclosure

Hereinafter, an optical fiber alignment method, specific structures of an alignment device and a connection device according to the present disclosure will be described in detail with reference to the accompanying drawings. It is noted that, the present invention is not limited to these examples, but is defined by the scope of claims, and is intended to include all modifications within the meaning and scope equivalent to the scope of claims. In addition, in the description of the drawings, the same elements are denoted by the same reference numerals, and redundant description thereof will be omitted.

The optical fiber alignment method of the present disclosure is suitable for aligning an object, such as a multi-core optical fiber (MCF), having a refractive index changing portion therein and having a structure in which the refractive index changes depending on the orientation around the fiber axis (central axis). Specific examples of the to-be-aligned object include bundle fiber and the like in addition to the MCF. In addition, it can also be applied to alignment of a ferrule (included in an optical connector), a fiber array, or the like in which core arrangement of each of two optical fibers to be optically connected need to be matched.

FIG. 1 is a view showing appearances (partly including a cutaway view) and cross-sectional structures of various optical fibers that can be applied to an optical fiber alignment method and the like according to the present disclosure. It is noted that, the upper part of FIG. 1 shows an external view of an MCF 10 and a cross-sectional structure of MCF 10 taken along the line I-I shown in the external view. The lower part of FIG. 1 shows an external view of a bundle fiber 30 and a cross-sectional structure of bundle fiber 30 taken along the line III-III shown in the external view.

MCF 10 shown in the upper part of FIG. 1 includes a glass fiber 13 extending along a fiber axis AX (central axis) and a resin coating 14 provided on an outer circumferential surface of glass fiber 13. Glass fiber 13 includes a plurality of cores 11 extending along fiber axis AX and a common cladding 12 surrounding each of the plurality of cores 11. In a cross section of MCF 10 orthogonal to fiber axis AX, fiber axis AX passes through the center of the cross section of common cladding 12.

Bundle fiber 30 shown in the lower part of FIG. 1 includes a housing 31 and a plurality of single-core optical fibers 32 (hereinafter referred to as "SCF"). Housing 31 has a front end surface 31A and a rear end surface 31B opposite to front end surface 31A. Further, housing 31 has a front opening 33 provided on front end surface 31A and an accommodation space 34 for accommodating a plurality of SCFs 32 in a state where the tip parts thereof are bundled. A resin coating is removed from tip parts of a plurality of SCFs 32 (a glass fiber 320), and each end surface of a plurality of SCFs 32 is located at front opening 33. Therefore, a structure of front end surface 31A of bundle fiber 30 is substantially similar to that of the end surface of MCF 10. It is noted that, each of the plurality of SCFs includes glass fiber 320 covered with the resin coating. Glass fiber 320 includes a core 321 and a cladding 322 surrounding core 321.

FIG. 2 is a view showing various configuration examples of fixation jigs (included in a connection device of the present disclosure) for fixing (including temporary fixation) an optical fiber, which have been aligned. The connection device of the present disclosure includes a fixation jig for holding the arrangement of elements on the end surface of an optical fiber, which have been aligned, and as an application example of the fixation jig, a fixation state (referred to as "temporary fixation mechanism" in FIG. 2) of MCF 10 to a temporary fixation mechanism 50 used for connection work such as fusion connection, is shown in the upper part of FIG. 2. In the middle part of FIG. 2, a fixation state of MCF 10 to a ferrule 60 constituting a part of the optical connector (referred to as "ferrule fixation" in FIG. 2) is shown. In the lower part of FIG. 2, a fixation state of a plurality of MCFs 10 to a fiber array 70 (referred to as "fiber array fixation" in FIG. 2) is shown. It is noted that, although MCF 10 is shown as an example of the fixed to-be-aligned object in FIG. 2, various optical fibers shown in FIG. 1 can be applied. In addition, the fixation jigs shown in FIG. 2 can serve as an alignment reference for MCF 10 and also functions as members for holding the core arrangements in MCF 10, which have been aligned.

In the "temporary fixation mechanism" shown in the upper part of FIG. 2, a tip part of MCF 10 (a part where glass fiber 13 is exposed by removing resin coating 14) is held by temporary fixation mechanism 50. Temporary fixation mechanism 50 includes a lower member 51 provided with a V-shaped groove 51b in which the tip part of MCF 10 is installed, an upper member 52 for pressing the tip part of MCF 10 against V-shaped groove 51b, and a hinge 53 for attaching upper member 52 to lower member 51 in an openable and closable manner. After MCF 10 is rotated around fiber axis AX in the circumferential direction indicated by an arrow S1 (after alignment), the tip part of MCF 10 is fixed to temporary fixation mechanism 50, so that a core arrangement on the end surface of MCF 10 is held with respect to temporary fixation mechanism 50.

In the "ferrule fixation" shown in the middle part of FIG. 2, ferrule 60 constituting a part of the optical connector is fixed to the tip part (glass fiber 13) of MCF 10 from which resin coating 14 has been removed. After MCF 10 is rotated around fiber axis AX in the circumferential direction indicated by an arrow S2 (after alignment), ferrule 60 is bonded and fixed to the tip part of MCF 10, whereby the core arrangement on the end surface of MCF 10 is held with respect to ferrule 60.

In the "fiber array fixation" shown in the lower part of FIG. 2, a plurality of tip parts of MCF 10 from which resin coating 14 has been removed are held by fiber array 70. Fiber array 70 includes a lower member 71 provided with V-shaped grooves 710 in which glass fibers 13 of a plurality of MCFs 10 are respectively installed, and an upper member 72 for pressing each glass fiber 13 against corresponding V-shaped grooves 710. Each of the plurality of MCFs 10 is rotated around fiber axis AX in a direction indicated by an arrow S3 (alignment). After the alignment, each of the plurality of MCFs 10 is for example, bonded and fixed to fiber array 70 by an adhesive such as an ultraviolet-ray-curing resin in a state of being sandwiched between V-shaped groove 710 of lower member 71 and upper member 72. Accordingly, the core arrangement on the each end surface of the plurality of MCFs 10 is held with respect to fiber array 70.

Figure 3:
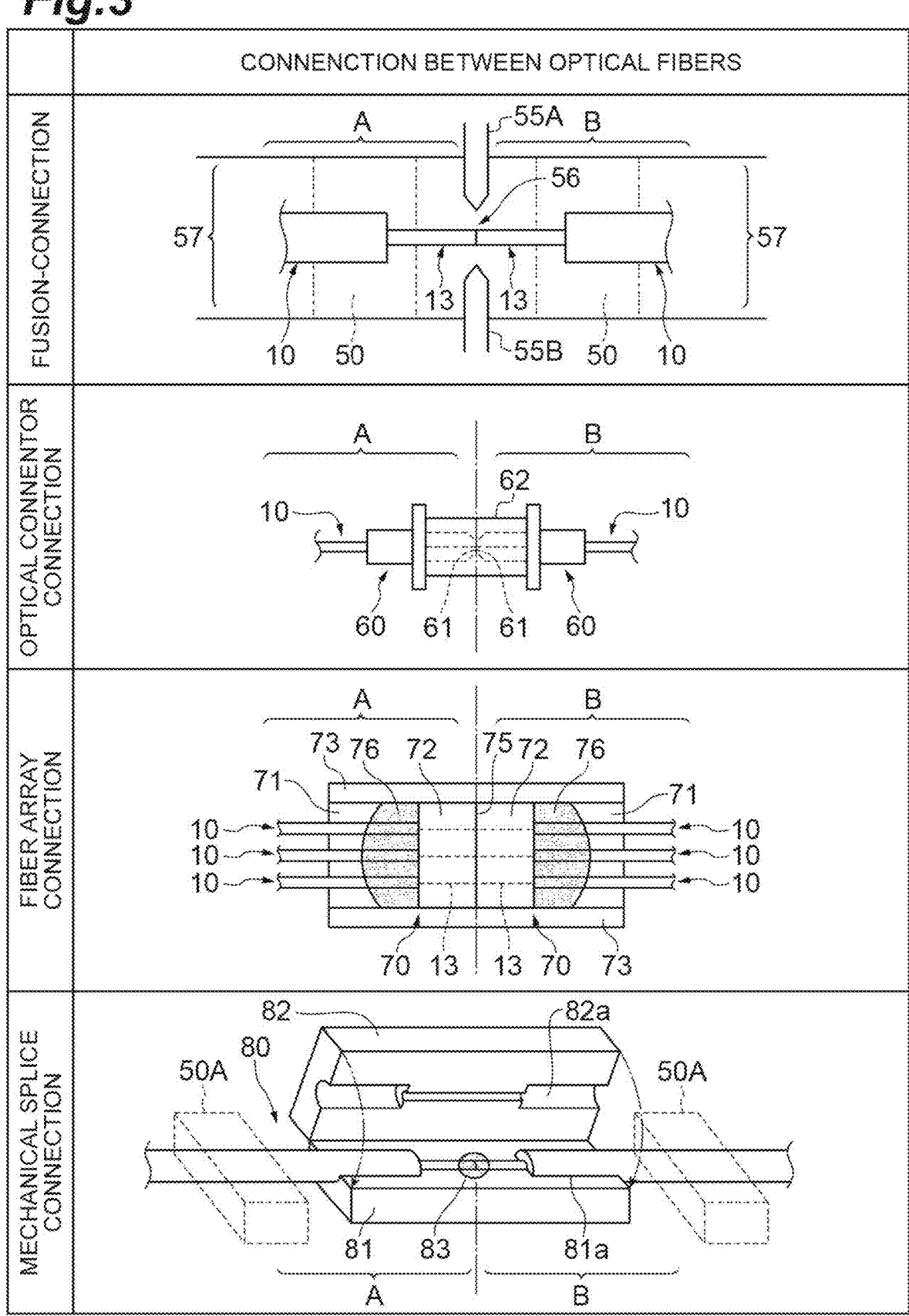
FIG. 3 is a view showing various configurations (included in a connection device of the present disclosure) for connecting two optical fibers which are aligned and fixed.

FIG. 3 is a view showing various configurations (included in a connection device of the present disclosure) for connecting two optical fibers which are aligned and fixed. As an application example of the connection device of the present disclosure, a connection example by a fusion device (referred to as "fusion connection" in FIG. 3) is shown in the top part of FIG. 3. In the second part of FIG. 3, a connection example by an optical connector (referred to as "optical connector connection" in FIG. 3) is shown. In the third part of FIG. 3, a connection example between fiber arrays (referred to as "fiber array connection" in FIG. 3) is shown. In the bottom part of FIG. 3, a connection example by a mechanical splice element (referred to as "mechanical splice connection" in FIG. 3) is shown. It is noted that, in FIG. 3, a fixation side optical fiber (an optical fiber excluded from a to-be-aligned object) is shown in a region denoted by reference numeral "A", and an alignment side optical fiber (an optical fiber selected as a to-be-aligned object) is shown in a region denoted by reference numeral "B". However, any optical fiber in the regions denoted by reference numerals "A" and "B" can be selected as a to-be-aligned object.

The "fusion connection" shown in the top part of FIG. 3 shows a simple configuration example of the fusion device for fusion-connecting end surfaces of MCFs 10 to each other in which each tip part is fixed to temporary fixation mechanism 50. Temporary fixation mechanism 50 to which MCF 10 of a fixation side A is fixed and temporary fixation mechanism 50 to which MCF 10 of an alignment side B is fixed are installed in a guide groove 57. When temporary fixation mechanisms 50 of fixation side A and alignment side B are brought close to each other along guide groove 57, the end surface of MCF 10 of fixation side A and the end surface of MCF 10 of alignment side B are abutted against each other between discharge electrodes 55A and 55B. By the discharge generated between discharge electrodes 55A and 55B, the end surface of MCF 10 of fixation side A and the end surface of MCF 10 of alignment side B are fusion-connected (reference numeral "56" in FIG. 3 denotes a fusion portion).

The "Optical connector connection" shown in the second part of FIG. 3 shows a simple configuration example of an optical connector for optically connecting the end surfaces of MCF 10 to which ferrules 60 are fixed to the respective tip parts. Ferrule 60 fixed to MCF 10 of fixation side A and ferrule 60 fixed to MCF 10 of alignment side B are accommodated in a sleeve 62. At this time, respective ferrule end surfaces 61 are held by sleeve 62 so as to face each other in a state of abutting against each other or being spaced apart from each other by a predetermined distance. In this "optical connector connection", the end surface of MCF 10 of fixation side A and the end surface of MCF 10 of alignment side B may be in contact with each other or may not be in contact with each other.

The "Fiber array connection" shown in the third part of FIG. 3 shows a simple configuration example for optically connecting the end surface of MCF 10 in which each tip part is fixed to fiber array 70 of fixation side A and the end surface of MCF 10 in which each tip part is fixed to fiber array 70 of alignment side B. Fiber array 70 to which MCFs 10 of fixation side A is fixed and fiber array 70 to which MCFs 10 of alignment side B is fixed are installed in a guide member 73. Fiber arrays 70 of fixation side A and alignment side B are brought close to each other along guide member 73, and their end surfaces are bonded to each other by means of an adhesive 76 such as an ultraviolet-ray-curing resin to form a joint portion 75. In this "fiber array connection", since fiber arrays 70 of fixation side A and alignment side B are positioned by guide members 73, the end surface of MCF 10 of fixation side A and the end surface of MCF 10 of alignment side B coincide with each other due to adhesion between fiber arrays 70. It is noted that both fiber arrays 70 of fixation side A and alignment side B include lower member 71 having V-shaped groove 710 for holding glass fiber 13 of MCF 10 from which resin coating 14 is removed, and upper member 72 for pressing glass fiber 13 against V-shaped groove 710 of lower member 71, and MCF 10, lower member 71 and upper member 72 are fixed to each other by adhesive 76 such as an ultraviolet-ray-curing resin.

The "mechanical splice connection" shown in the bottom part of FIG. 3 shows a simple configuration example for optically connecting the end surfaces of MCFs 10 in which the portions covered with respective resin coatings 14 are fixed by a temporary fixation mechanism 50A. The tip part of MCF 10 fixed to temporary fixation mechanism 50A of fixation side A and the tip part of MCF 10 fixed to temporary fixation mechanism 50A of alignment side B are respectively accommodated in a mechanical splice element 80. Mechanical splice element 80 includes a lower member 81 provided with a groove 81a for holding MCF 10 of fixation side A and alignment side B in an optically connected state, and likewise an upper member 82 provided with a groove 82a for holding MCF 10 of fixation side A and alignment side B in an optically connected state. The end surfaces of MCF 10 of fixation side A and alignment side B accommodated in mechanical splice element 80 are maintained in an optically connected state by means of an index matching material 83.

Figure 4:
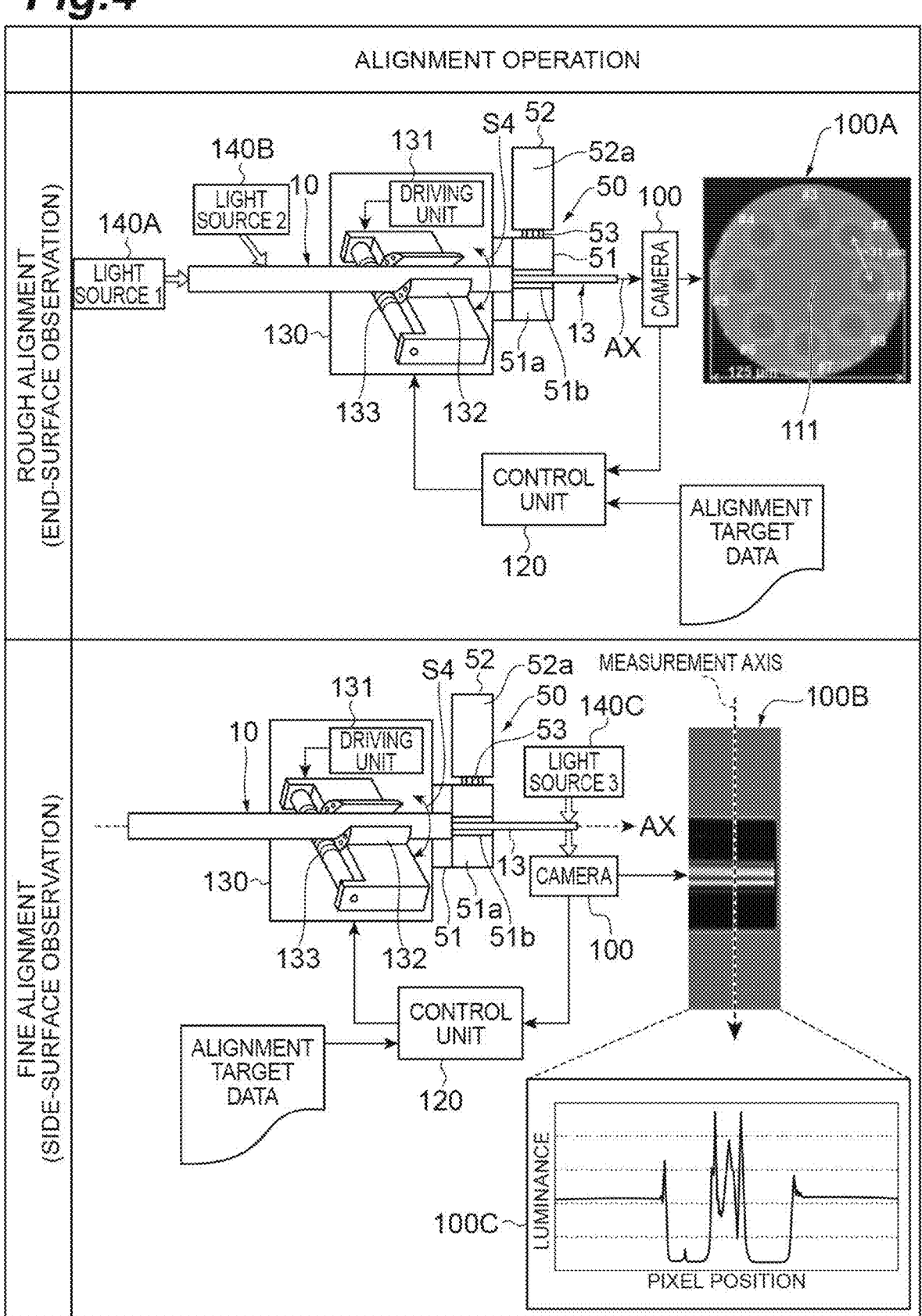
FIG. 4 is a view showing simple device configuration examples for explaining an alignment operation in an optical fiber alignment method of the present disclosure.

FIG. 4 is a view showing examples for explaining an alignment operation in an optical fiber alignment method of the present disclosure. The upper part of FIG. 4 shows a simple device configuration example (rough alignment unit) for explaining the rough alignment operation (end-surface observation). The lower part of FIG. 4 shows a simple device configuration example (fine alignment unit) for explaining the fine alignment operation (side-surface observation). In the upper and lower parts of FIG. 5, there are shown temporary fixation mechanism 50 (referred to as "type 1" in FIG. 5) and temporary fixation mechanism 50A (referred to as "type 2" in FIG. 5) which are mechanisms for holding an optical fiber (MCF 10 in the example shown in FIG. 4) to be a to-be-aligned object and for holding the optical fiber during alignment work and fixing the optical fiber, which have been aligned.

The device configuration example shown in the upper part of FIG. 4 is a device for implementing the optical fiber alignment method (rough alignment operation by end-surface observation) of the present disclosure, and includes a light source 140A (referred to as "light source 1" in FIG. 4), a light source 140B (referred to as "light source 2" in FIG. 4), an alignment mechanism 130 (first rotation unit), temporary fixation mechanism 50, a camera 100 (first image acquisition unit), and a control unit 120 that also functions as the measurement unit. It is noted that, although MCF 10 is shown as the to-be-aligned object in FIG. 4, various optical fibers requiring alignment as shown in FIG. 1 can be applied.

Light source 140A emits light for observation into MCF 10 from a rear end surface of MCF 10, which is a to-be-aligned object. On the other hand, light source 140B irradiates light for observation to an inside of MCF 10 from the side surface of MCF 10. The light irradiated from both light source 140A and light source 140B is emitted from the front end surface of MCF 10, and an end surface image 100A of MCF 10 is acquired by camera 100 (primary image obtaining sub step). That is, light from light source 140A and light source 140B form a light and dark pattern of portions (a plurality of elements forming the end surface) having different refractive indices in MCF 10. For example, a cladding and a marker are displayed dark and a core is displayed bright, so that the positions of the cladding, the core, and the marker can be identified from light and dark patterns. Camera 100 acquires the light and dark pattern as end surface image 100A.

In the upper part of FIG. 4, as an example, a core #1 to a core #8 are arranged at equal gaps with a center-to-center distance of 31 um so as to surround the center (center of end surface) of cladding with an outer diameter of 125 um, and a marker 111 is shown at position shifted from the cross-sectional center. Components of the end surface include core #1 to core #8, marker 111, cladding (common cladding in the example of FIG. 4), and a portion displayed as a light and dark pattern in end surface image 100A. A circle surrounding core #1 to core #8 and marker 111 corresponds to an outer periphery of cladding.

Control unit 120 controls light source 140A and light source 140B that perform the primary image obtaining sub step as the rough alignment step, and camera 100 as the first image obtaining unit. Further, control unit 120, as the measurement unit, performs measurement (measurement sub step) of elements constituting the end surface of MCF 10 (substantially glass fiber 13) and controls the first rotating unit that performs rotation (primary rotating sub step) of MCF 10 along the circumferential direction around fiber axis AX of MCF 10. It is noted that, control unit 120 preferably has a memory for recording a measurement data (alignment target data) of another optical fiber to be optically connected to the to-be-aligned object (MCF 10 shown in FIG. 4), and the rotation control of the to-be-aligned object is performed so that the measurement data of the to-be-aligned object obtained by the measurement sub step coincides with the alignment target data.

A simple configuration example of alignment mechanism 130 is shown in the upper part of FIG. 4. However, for example, an alignment device disclosed in the above-mentioned PTL 2 can be applied to alignment mechanism 130, and the entirety of the PTL 2 is incorporated herein by reference. In the "alignment device" shown in the upper part of FIG. 4, alignment mechanism 130 includes a driving unit 131, a holding member 132 for holding a side surface of MCF 10 which is a to-be-aligned object, and a rotary shaft 133 for rotating holding member 132 along a circumferential direction indicated by an arrow S4 around fiber axis AX in a state where MCF 10 is held. A screw groove is formed on a side surface of rotary shaft 133, and a protrusion provided on an end surface of holding member 132 is engaged with the screw groove. When driving unit 131 rotates rotary shaft 133 by a predetermined amount according to a control instruction of control unit 120, holding member 132 holding MCF 10 rotates along the circumferential direction indicated by arrow S4 in conjunction with the rotation. Thus, MCF 10 is aligned. Driving unit 131 is, for example, a motor such as a stepping motor.

The device configuration example shown in the lower part of FIG. 4 is a device for implementing the optical fiber alignment method (fine alignment operation by side-surface observation) of the present disclosure, and includes a light source 140C (referred to as "light source 3" in FIG. 4), alignment mechanism 130 (second rotation unit), temporary fixation mechanism 50, camera 100 (second image acquisition unit), and control unit 120. The lower part of FIG. 4 also shows an example in which MCF 10 is applied as a to-be-aligned object.

Light source 140C irradiates light for observation to a side surface of MCF 10 (glass fiber 13 with resin coating 14 removed) which is a to-be-aligned object. The light irradiated from light source 140C is emitted from a side opposite to the irradiated portion of MCF 10, and a side surface image 100B of MCF 10 is obtained by camera 100 (secondary image obtaining sub step). That is, the light from light source 140C forms a light and dark pattern of portions having different refractive indices in MCF 10. For example, a cladding and a marker are displayed dark and a core is displayed bright, so that the positions of the cladding, the core and the marker can be identified from the light and dark patterns. Camera 100 obtains the light and dark pattern as side surface image 100B. A luminance distribution 100C along the measurement axis shown in side surface image 100B is also shown in FIG. 4. It is noted that, in luminance distribution 100C, the horizontal axis represents a pixel position along the measurement axis shown in side surface image 100B, and the vertical axis represents a luminance of each pixel. When the fine alignment step of two MCFs 10 is performed, fine alignment of two MCFs 10 is performed by pattern matching while checking side surface images 100B of two MCFs 10 arranged close to each other.

Noted that, in the apparatus configuration example shown in the lower part of FIG. 4, control unit 120 controls light source 140C that performs the secondary image obtaining sub step as the fine alignment step and camera 100 as the second image obtaining unit. Further, control unit 120 controls the second rotation unit to rotate MCF 10 of the to-be-aligned object along the circumferential direction around fiber axis AX based on the pattern matching based on side surface image 100B. It is noted that, when the side surface image of the to-be-aligned object (MCF 10 shown in FIG. 4) and the side surface image of another optical fiber to be optically connected to the to-be-aligned object are separately obtained, control unit 120 preferably has a memory for recording the side surface image of the other optical fiber as the alignment target data, and the rotation control of the to-be-aligned object is performed so that the side surface image of MCF 10 of the to-be-aligned object coincides with the side surface image of other MCF 10. Noted that, alignment mechanism 130 shown in the lower part of FIG. 4 is the same as the device configuration example shown in the upper part of FIG. 4 described above.

In the device configuration examples shown in both the upper and lower parts of FIG. 4 described above, temporary fixation mechanism 50 is disposed at the tip part of MCF 10. As shown in the upper part of FIG. 5, temporary fixation mechanism 50 includes lower member 51, upper member 52, and hinge 53 for attaching upper member 52 to lower member 51 in an openable and closable state. Lower member 51 has a contact surface 51a, and contact surface 51a is formed with V-shaped groove 51b for holding the tip part (glass fiber 13) of MCF 10 from which resin coating 14 is removed. On the other hand, upper member 52 has a contact surface 52a. During the alignment work of MCF 10, contact surface 51a of lower member 51 and contact surface 52a of upper member 52 are maintained in a separated state, and after the alignment, contact surface 52a of upper member 52 is pressed against contact surface 51a of lower member 51, so that the arrangement of the elements on the end surface of MCF 10 installed in V-shaped groove 51b is held with respect to temporary fixation mechanism 50. Thereafter, the aligned MCF 10 is fusion-connected to another MCF 10 by the fusion device shown in the top part of FIG. 3.

Figure 5:
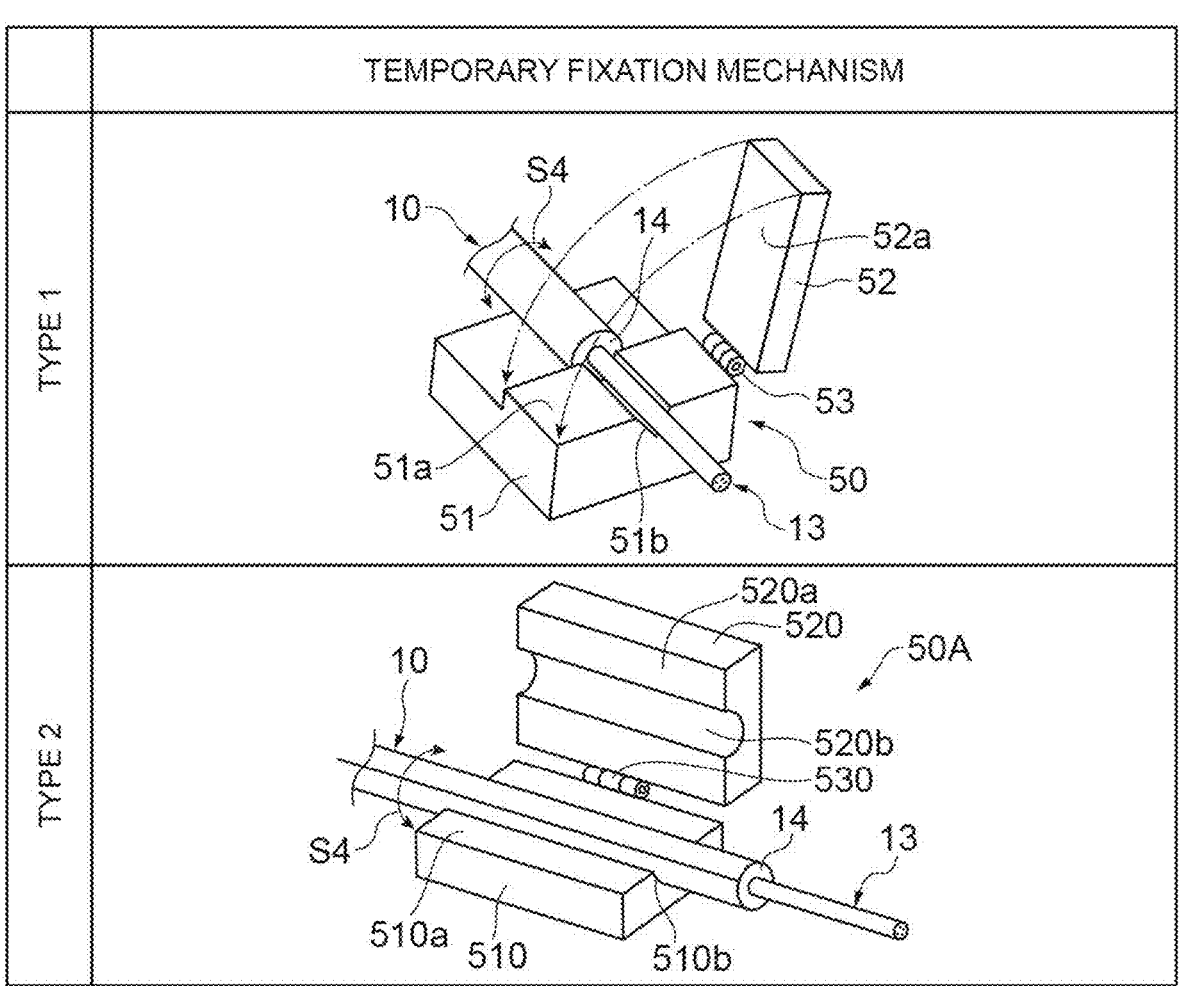
FIG. 5 is a view showing structures of various temporary fixation mechanisms.

Temporary fixation mechanism 50A shown in the lower part of FIG. 5 can also be applied to align and fix MCF 10. This temporary fixation mechanism 50A functions as a means for holding the arrangement of elements on the end surface of MCF 10 in order to install MCF 10, which has been aligned, to mechanical splice element 80 shown in the bottom of FIG. 3. It is noted that, temporary fixation mechanism 50A includes a lower member 510, an upper member 520, and a hinge 530. Lower member 510 has a contact surface 510a, and contact surface 510a is formed with a groove 510b for holding a side surface (a portion covered with resin coating 14) of MCF 10 which is a to-be-aligned object. On the other hand, upper member 520 has a contact surface 520a, and a groove 520b for holding a side surface of MCF 10 is formed on contact surface 520a. During alignment work of MCF 10, the contact surface contact surface 510a of lower member 510 and contact surface 520a of upper member 520 are maintained in a separated state, and after alignment, contact surface 520a of upper member 520 is pressed against contact surface 510a of lower member 510 so that the arrangement of elements on the end surface of MCF 10 installed in groove 510b is held with respect to temporary fixation mechanism 50A. Aligned MCF 10 is then optically connected to another MCF 10 by mechanical splice element 80 shown in the bottom part of FIG. 3.

Figure 6:
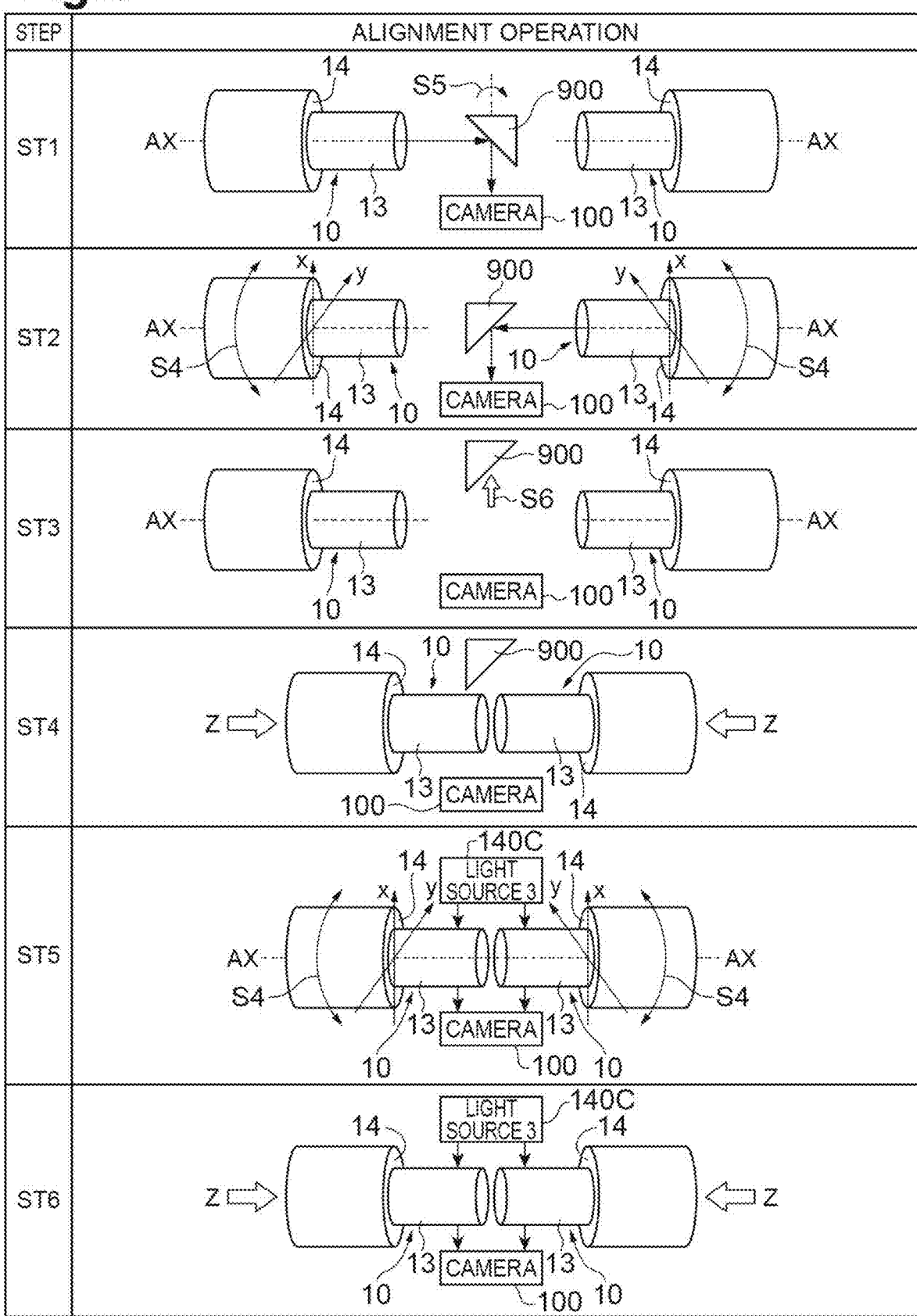
FIG. 6 is a view for explaining each step of an optical fiber alignment method of the present disclosure.

FIG. 6 is a view for explaining each step of an optical fiber alignment method of the present disclosure. In the optical fiber alignment method of the present disclosure, the rough alignment step by end-surface observation and the fine alignment step by side-surface observation are performed. It is noted that, the optical fiber alignment method of the present disclosure is suitable for alignment of the optical fiber such as the MCF as shown in FIG. 1 which has the refractive index changing portion therein and further has the structure in which the refractive index changes depending on the orientation. In the following description, an alignment operation of two MCFs will be described. In addition, in the examples of FIG. 6, each of two MCFs 10 is set as the to-be-aligned object, but as shown in FIG. 3, one of the two optical fibers may be set as the optical fiber of fixation side A as the alignment target, and the other may be set as the optical fiber of alignment side B.

(Rough Alignment by End-Surface Observation)

In the rough alignment step, the left-side MCF10 and the right-side MCF10 are aligned based on the result of the end face observation of the left-side MCF10 and the right-side MCF10 so that the correspondence between the plurality of arranged cores (first cores) on the end face (first end face) of the left side MCF10 and the plurality of arranged cores (second cores) on the end face (second end face) of the right side MCF10 falls within an allowable range in which the correspondence can be uniquely determined. The left-side MCF is the arranged MCF10 on the left side in FIG. 6, and is a first optical fiber extending along the first central axis. The right-side MCF is the arranged MCF10 on the right side in FIG. 6, and is a second optical fiber extending along the second central axis.

Figure 8:
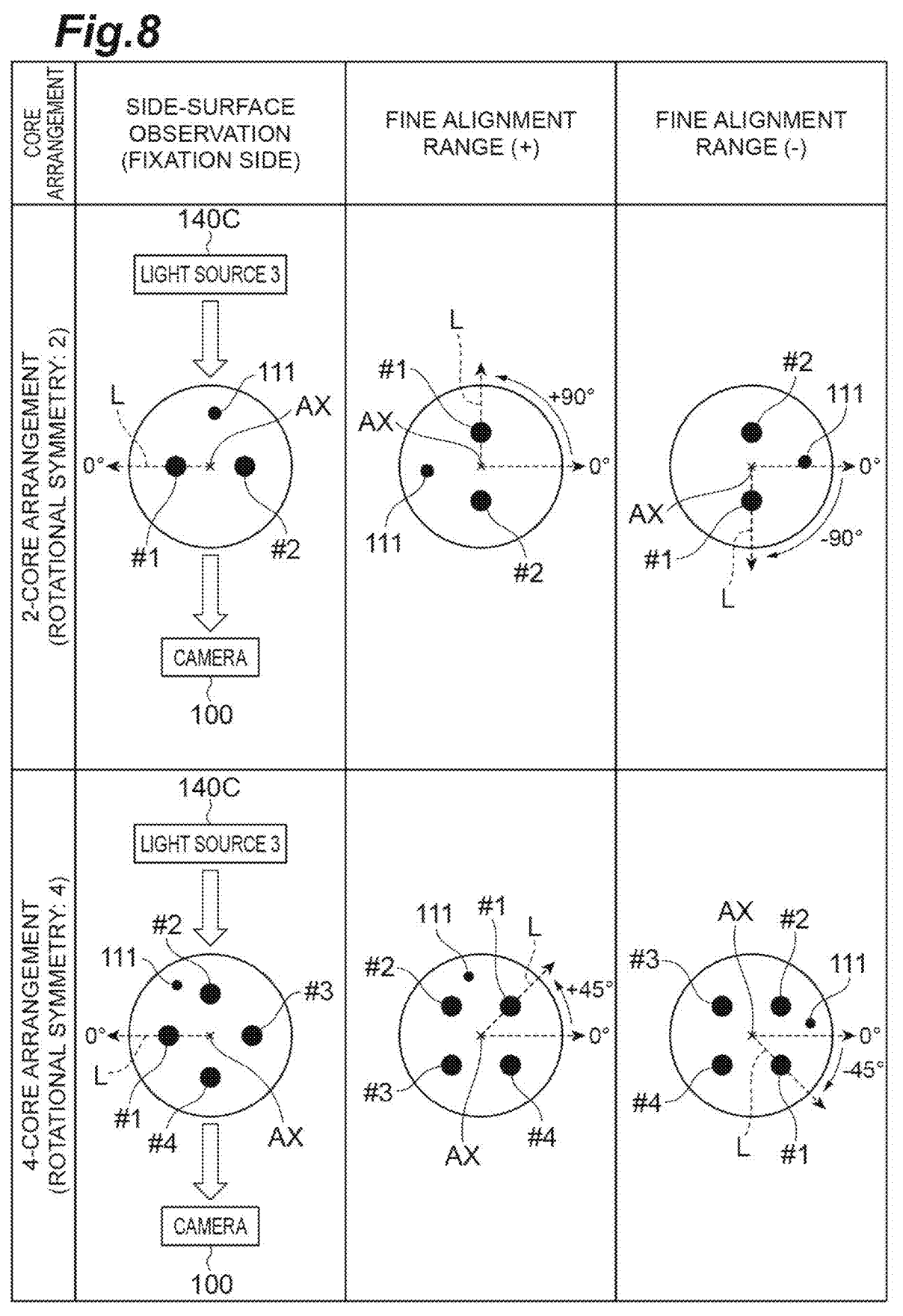

It is noted that, when both the core arrangement defined on the end surface of the left-side MCF 10 (first core arrangement) and the core arrangement defined on the end surface of the right-side MCF 10 (second core arrangement) have n-fold (n is two or more) rotational symmetry (first condition) as in the example shown in FIG. 8, the maximum angle defining the allowable range is set for the angle (first angle) formed by the orientation indicated by the first line defined on the end surface of the left-side MCF 10 and the orientation indicated by the second line defined on the end surface of the right-side MCF 10, and is substantially equal to or less than the rotation period. Here, each of the first and second lines means a straight line defined on the end surface of each of the left-side MCF 10 and the right-side MCF 10 and extending from the center of the end surface so as to pass through the center of a specific core among the plurality of cores (for example, a line L shown in FIG. 8). In addition, the rotation period is angle information defining rotational symmetry of a core arrangement formed of a plurality of cores on the end surface, and for example, when the core arrangement on the end surface has n (≥2)-fold rotational symmetry with respect to the center of the end surface, the rotation period is given as 360°/n.

Figure 9:
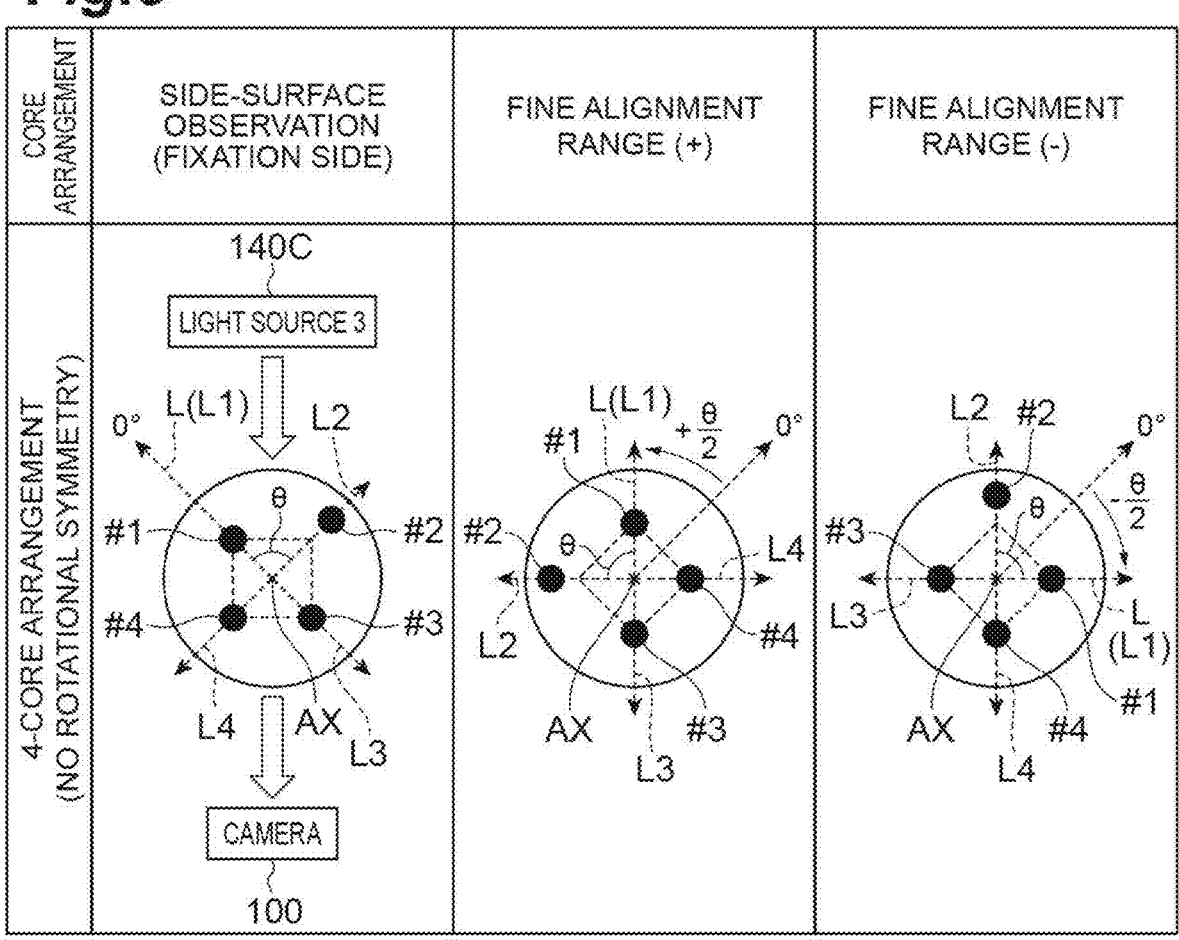
FIG. 9 is a view for explaining a rotational alignment accuracy in a rough alignment step and a fine alignment step as an example of an alignment operation between two MCFs in which each core arrangement does not have rotational symmetry.

When both the core arrangement (first core arrangement) of the left-side MCF 10 and the core arrangement (second core arrangement) of the right-side MCF 10 have no rotational symmetry (second condition), for example, as shown in FIG. 9, the maximum angle defining the allowable range is an angle (second angle) set with respect to the angle formed by the orientation indicated by line L (first line) defined on the end surface of left-side MCF 10 and the orientation indicated by line L (second line) defined on the end surface of the right-side MCF 10, is a minimum angle or less, the minimum angle being an angle other than zero among angles formed by the radial line elements extending from the center of the end surface on the same end surface. Here, the minimum angle being an angle other than zero is minimum angle formed by adjacent radial line elements among radial line elements L1 to L4 extending radially from the center of the end surface as defined on the end surface of the left-side MCF 10 and passing through the center of each of core #1 to core #4, or the minimum angle formed by adjacent radial line elements among radial line elements L1 to L4 extending radially from the center of the end surface as defined on the end surface of the right-side MCF 10 and passing through the center of each of core #1 to core #4, and corresponds to, for example, an angle θ shown in FIG. 9.

First, in the rough alignment step, as the primary image obtaining sub step, an end surface image (light and dark pattern as shown in FIG. 4) of the left-side MCF 10 is obtained by camera 100 (step ST1). Between the left-side MCF 10 and the right-side MCF 10, a mirror 900 having a reflecting surface inclined at 45° with respect to each fiber axis AX is disposed. When light for observation is simultaneously incident from the rear end surface and the side surface of the left-side MCF 10, the light for observation is emitted from the front end surface (a surface directly facing the reflective surface of mirror 900) of the left-side MCF 10, and camera 100 acquires the end surface image through mirror 900.

When the end surface image of the left-side MCF 10 is obtained, mirror 900 is reversed in a direction indicated by an arrow S5, so that the end surface image of the right-side MCF 10 is obtained by camera 100 similar to the left-side MCF 10. When the end surface image of each of the left-side MCF 10 and the right-side MCF 10 is obtained, the measurement sub step and the primary rotating sub step are successively executed (step ST2). That is, in the measurement sub step, each dimension and center position is measured of at least a plurality of elements (a core, a marker, a cladding, and the like), from each of the end surface images of the left-side MCF 10 and the right-side MCF 10 as the information relating to the arrangement of the elements on the end surface. For example, control unit 120 determines a movement amount in an x-axis direction, a movement amount in a y-axis direction, and a rotation angle of each of the left-side MCF 10 and the right-side MCF 10 based on the result of the measuring of the left-side MCF 10 and the right-side MCF 10, and controls various driving systems for changing the postures of the left-side MCF 10 and the right-side MCF 10. In the control of the driving systems, rotational alignment (primary rotating sub step) with respect to the left-side MCF 10 and the right-side MCF 10 is performed so that a correspondence relationship between elements such as cores of the left-side MCF 10 and the right-side MCF 10 falls within an allowable range in which the correspondence relationship can be uniquely determined.

As described above, when the rough alignment step ends, mirror 900 is retracted in a direction indicated by an arrow S6 (step ST3). Thereafter, the left-side MCF 10 and the right-side MCF 10 are moved along the z-axis so that the end surface of the left-side MCF 10 and the end surface of the right-side MCF 10 are arranged close to each other (step ST4: moving step). This moving step is also controlled by control unit 120.

Figure 7:
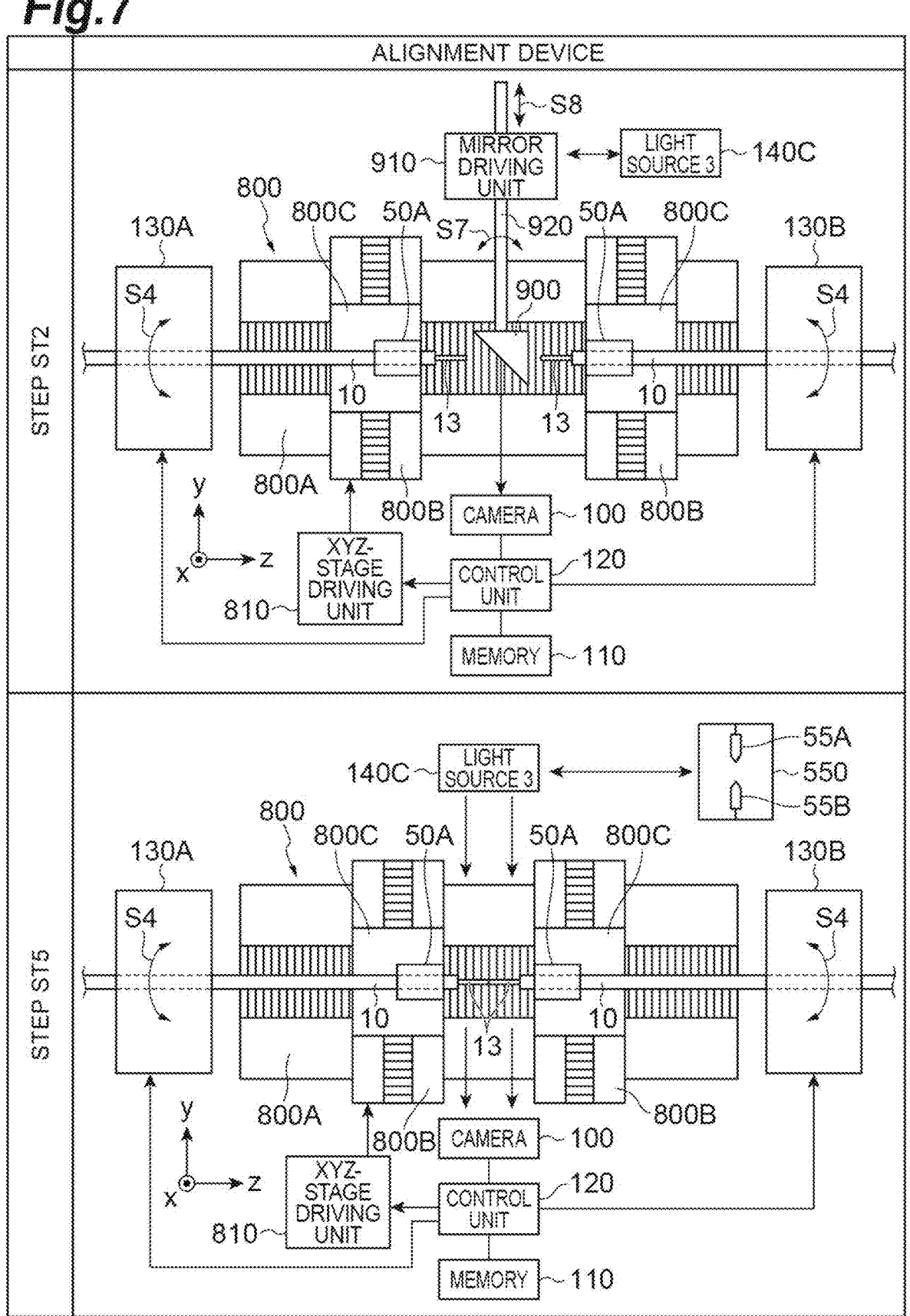
FIG. 7 is a view showing configuration examples of an alignment device in step ST2 and step ST5 in shown in FIG. 6.

The upper part of FIG. 7 shows a configuration example of an alignment device (rough alignment unit) for performing the above-described rough alignment step (from step ST1 to step ST3). The rough alignment unit mainly includes an XYZ stage 800 for performing the rough alignment step in the above-described step ST2, camera 100 (first image obtaining unit), a memory 110, control unit 120 also functioning as the measurement unit, an alignment mechanism 130A for left-side MCF 10, and an alignment mechanism 130B for the right-side MCF 10. It is noted that, in the rough alignment unit, by alignment mechanism 130A and alignment mechanism 130B, the first rotation unit is formed which is capable of performing any alignment operation of the rough alignment under the first condition and the rough alignment under the second condition. Further, the alignment device shown in the upper part of FIG. 7 includes mirror 900 for guiding light for end-surface observation from the left-side MCF 10 and the right-side MCF 10 (light irradiated from light source 140A and light source 140B to the rear end surface and the side surface of MCF 10 as shown in the upper part of FIG. 4) to camera 100, a support shaft 920 for holding mirror 900, and a mirror driving unit 910. Control unit 120 performs the above-described measurement sub step, and performs drive control of an XYZ stage driving unit 810 for movement control of XYZ stage 800, mirror driving unit 910 for attitude control of mirror 900, and alignment mechanisms 130A and 130B. It is noted that, in the example shown in the upper part of FIG. 7, both the left-side MCF 10 and the right-side MCF 10 are held by temporary fixation mechanism 50A, but temporary fixation mechanism 50 shown in the upper part of FIG. 5 may be applied. Any of the temporary fixation jigs can be moved to an arbitrary position by the XYZ stage which is installed. In addition, when the left-side MCF 10 is fixed as the alignment target, the fixation jig such as the fiber array shown in FIG. 2 may be applied instead of the temporary fixation mechanism shown in FIG. 5.

In order to be capable to change the positions of the left-side MCF 10 and the right-side MCF 10, XYZ stage 800 is formed of an Z-axis stage 800A for individually moving the left-side MCF 10 and the right-side MCF 10 along a z-axis, a Y-axis stage 800B for individually moving the left-side MCF 10 and the right-side MCF 10 along a y-axis, and an X-axis stage 800C for individually moving the left-side MCF 10 and the right-side MCF 10 along an x-axis.

Mirror driving unit 910 rotates support shaft 920 along a direction indicated by an arrow S7 (switching of the observation target) and moves support shaft 920 along a direction indicated by an arrow S8 (insertion and retraction of mirror 900). Alignment mechanism 130A rotates the left-side MCF 10 along the circumferential direction around fiber axis AX, and alignment mechanism 130B rotates the right-side MCF 10 along the circumferential direction around fiber axis AX. Alignment mechanism 130A and alignment mechanism 130B both have a similar structure as alignment mechanism 130 shown in the upper and lower parts of FIG. 4. In addition, after step ST4 (moving step) is completed, the driving system of mirror 900 (mirror 900, mirror driving unit 910, and support shaft 920) is replaced with light source 140C (light source 3) that irradiates light for side-surface observation.

(Fine Alignment by Side-Surface Observation)

When the end surfaces of the left-side MCF 10 and the right-side MCF 10 are arranged close to each other by the moving step (step ST4), the fine alignment step is performed (step ST5). The fine alignment step is an alignment step for increasing the optical coupling efficiency between the elements associated with each other between the left-side MCF 10 and the right-side MCF 10, which have been roughly aligned, and the rotational alignment of the to-be-aligned object (both or either of the left-side MCF 10 and the right-side MCF 10) is performed within the allowable range set in the rough alignment step described above. In detail, after the movement of the left-side MCF 10 and the right-side MCF 10, which have been roughly aligned, in the z-axis direction the rough alignment is completed as described above (step ST4), the positions of glass fiber 13 and core 11 are adjusted by observing the side surface image (light and dark pattern which can be confirmed by light refracted by glass fiber 13 or core 11) of the tip part (glass fiber 13 with resin coating 14 removed) of each of the left-side MCF 10 and the right-side MCF 10 as the to-be-aligned object.

In the fine alignment step of step ST5, first, light source 140C (light source 3) that irradiates light for side-surface observation is disposed instead of mirror 900. A light and dark pattern generated by light from light source 140C passing through glass fibers 13 of the left-side MCF 10 and the right-side MCF 10 is obtained by camera 100 as a side surface image (corresponding to 100B shown in the lower part of FIG. 4) of the left-side MCF 10 and the right-side MCF 10 (the secondary image obtaining sub step). Based on the side surface image, the rotational alignment of the left-side MCF 10 and the right-side MCF 10 is performed (secondary rotating sub step) so that the end surface position of core 11 in the left-side MCF 10 and the end surface position of core 11 in the right-side MCF 10 overlap along fiber axis AX (pattern matching), that is, so as to increase the optical coupling efficiency (preferably, maximize the coupling efficiency) between the associated elements between the left-side MCF 10 and the right-side MCF 10. When the rotational alignment of the left-side MCF 10 and the right-side MCF 10 in step ST5 is completed, the left-side MCF 10 and the right-side MCF 10 are moved along the z-axis direction so that the end surface of the left-side MCF 10 and the end surface of the right-side MCF 10 are abutted against each other for a work such as fusion connection (step ST6).

In the lower part of FIG. 7 shows a configuration example of an alignment device (fine alignment unit) for performing the above-described fine alignment step (step ST5). The fine alignment unit mainly includes XYZ stage 800 for performing the fine alignment step in the above-described step ST5, camera 100 (second image obtaining unit), memory 110, control unit 120, alignment mechanism 130A for the left-side MCF 10, and alignment mechanism 130B for the right-side MCF 10. It is noted that, in the fine alignment unit, a second rotation unit is formed by alignment mechanism 130A and alignment mechanism 130B. Further, light source 140C (light source 3) for obtaining a side surface image is arranged instead of the driving system of mirror 900 in the alignment device shown in the upper part of FIG. 7. Control unit 120 performs drive control of XYZ stage driving unit 810 for movement control of XYZ stage 800, and alignment mechanisms 130A and 130B in order to perform the fine alignment step of the above-described step ST5. It is noted that, the connection device of the present disclosure may include the fixation jig in addition to the above-described alignment device that performs rough alignment and fine alignment. Although temporary fixation mechanism 50A is applied to the fixation jig also in the example shown in the lower part of FIG. 7 as in the example shown in the upper part of FIG. 7, temporary fixation mechanism 50 shown in the upper part of FIG. 5 may be applied. Any of the temporary fixation jigs can be moved to an arbitrary position by the XYZ stage which is installed, and the operation can be continuously performed up to the connection of the left-side MCF 10 and the right-side MCF 10 shown in FIG. 3 following the rough alignment and the fine alignment. In addition, when the left-side MCF 10 is fixed as the alignment target, the fixation jig such as the fiber array shown in FIG. 2 may be applied instead of the temporary fixation mechanism shown in FIG. 5.

In order to be capable to change the positions of the left-side MCF 10 and the right-side MCF 10, XYZ stage 800 is formed of Z-axis stage 800A for individually moving the left-side MCF 10 and the right-side MCF 10 along the z-axis, Y-axis stage 800B for individually moving the left-side MCF 10 and the right-side MCF 10 along the y-axis, and X-axis stage 800C for individually moving the left-side MCF 10 and the right-side MCF 10 along the x-axis, similar to the alignment device shown in the upper part of FIG. 7. Alignment mechanism 130A rotates the left-side MCF 10 along the circumferential direction around fiber axis AX, and alignment mechanism 130B rotates the right-side MCF 10 along the circumferential direction around fiber axis AX. Alignment mechanisms 130A and 130B both have a similar structure as alignment mechanism 130 shown in the upper and lower parts of FIG. 4. Also, after completion of step ST6 (moving step), light source 140C is replaced by a discharge unit 550 that includes, for example, a pair of discharge electrodes 55A and 55B.

Next, the rotational alignment accuracy in the rough alignment step and the fine alignment step will be described with reference to FIG. 8. It is noted that, FIG. 8 is a view for explaining a rotational alignment accuracy in a rough alignment step and a fine alignment step as various examples of an alignment operation between two MCFs in which each core arrangement has rotational symmetry. In the normal alignment operation, there may be a situation where marker 111 of each of the left-side MCF 10 and the right-side MCF 10 cannot be detected in the fine alignment step (side-surface observation). In the optical fiber alignment method of the present disclosure, even in such a case, in order to match the positions of markers 111 in the fine alignment step, it is preferable that the rough alignment step is performed with such an accuracy that the rotational deviation between the core arrangement of the left-side MCF 10 and the core arrangement of the right-side MCF 10 falls within the angle range of the rotation period in which the core arrangements overlap (allowable range), and the fine alignment step is further performed within the range of the rotation period.

In the left side of FIG. 8, the end surface (two types of two core arrangements and four core arrangements) of the left-side MCF 10 in the fine alignment step (at the time of side-surface observation) is disclosed. Note that in the example of FIG. 8, light source 140C and camera 100 are arranged so as to sandwich the left-side MCF 10 as the device configuration at the time of side-surface observation (fine alignment step). The left-side MCF 10 is fixed as an alignment target. In addition, line L shown in FIG. 8 is a straight line (first line) extending from the center of the end surface (a point which fiber axis AX passes through) as a starting point so as to pass through the center of a specific core in the case of the left-side MCF 10, and indicates orientation indicating the core arrangement in the left-side MCF 10 which is an alignment target. Similarly, in the case of the right-side MCF 10, it is a straight line (second line) extending from the center of the end surface (a point which fiber axis AX passes through) as a starting point so as to pass through the center of a specific core, and indicates an orientation indicating the core arrangement in the right-side MCF 10 which is a to-be-aligned object.

In the case of the two core arrangement, on the end surface of each of the left-side MCF 10 and the right-side MCF 10, core #1, core #2, and marker 111 are covered with the common cladding, and the allowable range in the rough alignment step (the rotatable range in the fine alignment step) is set in the measurement sub step in the rough alignment step. Since the two core arrangement has twofold rotational symmetry, it has a rotation period of 180° (=360°/2). On the other hand, in the case of the four core arrangement, on the end surface of each of the left-side MCF 10 and the right-side MCF 10, core #1 to core #4 and marker 111 are covered with the common cladding, and the allowable range in the rough alignment step (the rotatable range in the fine alignment step) is set in the measurement sub step in the rough alignment step. Since the four core arrangement has fourfold rotational symmetry, it has a rotation period of 90° (=360°/4). It is noted that, in the case of a core arrangement having n (≥2)-fold rotational symmetries, the rotation period is defined as 360°/n.

Therefore, in the fine alignment step for the two core arrangement, the rotation angle for rotational alignment is determined within the maximum angle range of −180° to +180° around the rotation angle 0° (orientation indicating the core arrangement of the left-side MCF 10) as shown in the center and right of FIG. 8, and in the fine alignment step for the four core arrangement, the rotation angle for rotational alignment is determined within the maximum angle range of −90° to +90° around the rotation angle 0° as shown in the center and right of FIG. 8. It is noted that, in a state where the left-side MCF 10 and the right-side MCF 10 are aligned, an image viewed from the same direction by reflecting the respective end surfaces by a mirror is folded back on a straight line perpendicular to fiber axis AX common to both optical fibers. Therefore, the rotational alignment of the primary rotating sub step in the rough alignment step is performed by rotating the to-be-aligned object (the right-side MCF 10 when the left-side MCF 10 is fixed as in the example of FIG. 8) so that the deviation angle between the folded arrangement of the left-side MCF 10 image and the right-side MCF 10 image (the angle formed by line L (first line) indicating the orientation of the core arrangement in the left-side MCF 10 and line L (second line) indicating the orientation of the core arrangement in the right-side MCF 10) falls within the above-described allowable range (the maximum angle range shown in the center and the right side of FIG. 8). According to the above-described configuration, even when marker 111 cannot be observed at the time of side-surface observation, marker 111 can also be matched by matching the core arrangement.

FIG. 9 is a view for explaining a rotational alignment accuracy in a rough alignment step and a fine alignment step as an example of alignment operation between two MCFs in which each core arrangement does not have rotational symmetry. The core arrangement of each of the left-side MCF 10 and the right-side MCF 10 shown in FIG. 9 has a four core arrangement formed of core #1 to core #4 similarly to the example shown in the lower part of FIG. 8, but is different from the example shown in the lower part of FIG. 8 in that the position of core #2 is arranged closer to the outer peripheral portion side of the common cladding than the position shown in the lower part of FIG. 8. Accordingly, the core arrangement of each of the left-side MCF 10 and the right-side MCF 10 shown in FIG. 9 does not have rotational symmetry (when n=1). In addition, in the left side of FIG. 9, light source 140C and camera 100 are arranged so as to sandwich the left-side MCF 10 as the device configuration at the time of side-surface observation (fine alignment step). The left-side MCF 10 is fixed as an alignment target. In addition, in the case of the left-side MCF 10, radial line elements L1 to L4 shown in FIG. 9 are a group of straight lines (a plurality of first radial line elements) extending radially from the center of the end surface (the point which fiber axis AX passes through) as a starting point so as to pass through the centers of core #1 to core #4. Similarly, in the case of the right-side MCF 10, it is a group of straight lines (a plurality of second radial line elements) extending radially from the center of the end surface (a point which fiber axis AX passes through) as a starting point so as to pass through the centers of core #1 to core #4. It is noted that, line L shown in FIG. 9 is a straight line (first line) extending from the center of the end surface (the point which fiber axis AX passes through) as a starting point so as to pass through the center of the specific core (core #1) in the case of the left-side MCF 10, and indicates orientation indicating the core arrangement in the left-side MCF 10 which is the alignment target. Similarly, in the case of the right-side MCF 10, it is a straight line (second line) extending from the center of the end surface (the point which fiber axis AX passes through) as a starting point so as to pass through the center of the specific core (core #1), and indicates an orientation indicating the core arrangement in the right-side MCF 10 which is a to-be-aligned object. In addition, each of L1 to L4 shown on the end surface of the left-side MCF 10 is a radial line element extending radially from the center of the end surface of the left-side MCF 10 so as to pass through the center of core #1 to core #4, respectively, and the angle between adjacent radial line elements is all set to θ. In the example of FIG. 9, on the end surface of the left-side MCF 10, the minimum angle is θ, and line L and radial line element L1 passing through core #1 coincide with each other. Similarly, L1 to L4 shown on the end surface of the right-side MCF 10 is also radial line elements radially extending from the center of the end surface of the right-side MCF 10 to pass through the centers of core #1 to core #4, respectively, and the angle between adjacent radial line elements is also θ. Also in the case of the right-side MCF 10, the minimum angle is θ, and line L and radial line element L1 passing through core #1 coincide with each other.

In the case of the four core arrangement having fourfold rotational symmetry, as described above, core #1 to core #4 and marker 111 are covered with the common cladding on the end surface of each of the left-side MCF 10 and the right-side MCF 10, and the allowable range in the rough alignment step (rotatable range in the fine alignment step) is set in the measurement sub step in the rough alignment step. Since the four core arrangement has fourfold rotational symmetry, it has a rotation period of 90° (=360°/4). However, in the case of the core arrangement having no rotational symmetry as in the example of FIG. 9, it is difficult to set the allowable range in the rough alignment step.

Therefore, in the case of the four core arrangement shown in FIG. 9 as an example of the core arrangement having no rotational symmetry, the allowable range in the rough alignment step is roughly aligned such that, an angle formed by the orientation indicated by line L, line L being defined on the end surface of the left-side MCF 10 and extending from the center of the end surface in such a manner as to pass through the center of a specific core of core #1 to core #4 and the orientation indicated by line L, line L being defined on the end surface of the right-side MCF 10 and extending from the center of the end surface in such a manner as to pass through the center of the specific core (core #1 of the left-side MCF 10) of core #1 to core #4 that is associate with the specific core is a predetermined minimum angle or less, the predetermined minimum angle being an angle other than zero. Note that the minimum angle being an angle other than zero is the angle θ selected from angles formed between radial line element L1 and radial line element L4 in each of the end surface of the left-side MCF 10 and the end surface of the right-side MCF 10. Accordingly, in the example of FIG. 9 (four core arrangement having no rotational symmetry), in the fine alignment step, a rotation angle for rotational alignment is determined within a maximum angle range of −θ° to +θ° around a rotation angle of 0° (each of four orientations representing left-side MCF 10 core arrangement) as shown in the center and right side of FIG. 9. It is noted that, in a state where the left-side MCF 10 and the right-side MCF 10 are aligned, an image viewed from the same direction by reflecting the respective end surfaces by a mirror is folded back on a straight line perpendicular to fiber axis AX common to both optical fibers. Therefore, the rotational alignment of the primary rotating sub step in the rough alignment step is performed by rotating the to-be-aligned object (the right-side MCF 10 when the left-side MCF 10 is fixed as in the example of FIG. 9) so that the deviation angle between the folded arrangement of the left-side MCF 10 image and the right-side MCF 10 image (the angle formed by line L indicating the orientation of the core arrangement in the left-side MCF 10 and line L indicating the orientation of the core arrangement in the right-side MCF 10) falls within the above-described allowable range (the angle range shown in the center and the right side of FIG. 9). It is noted that, in the example of FIG. 9, no marker is arranged on each of the end surfaces of the left-side MCF 10 and the right-side MCF 10, but even when a marker is arranged (even when marker 111 cannot be observed at the time of side-surface observation), it is possible to naturally match the markers by matching the core arrangements.

Figure 10:
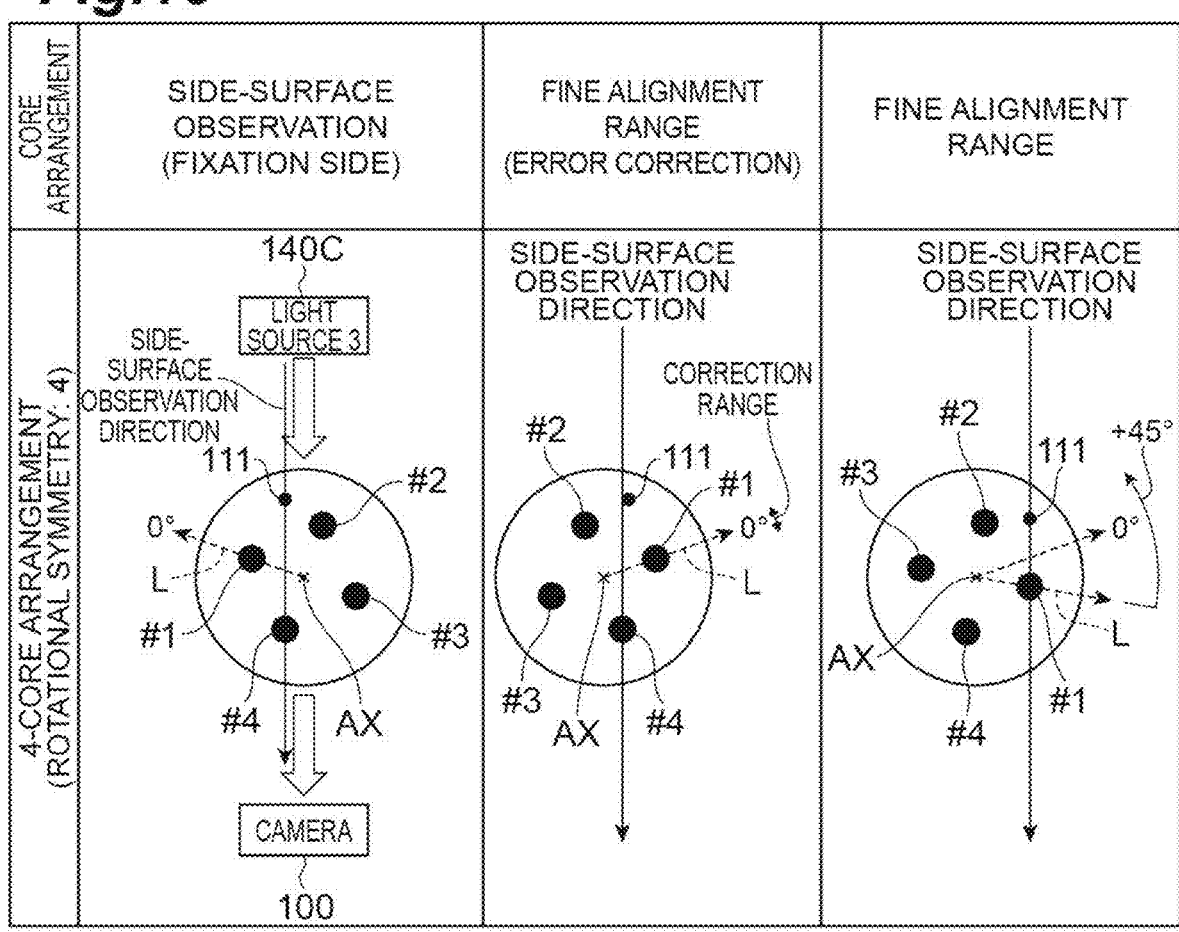
FIG. 10 is a view for explaining a rotational alignment accuracy in a rough alignment step and a fine alignment step as modification of an alignment operation between two MCFs in which each core arrangement has rotational symmetry.

Further, FIG. 10 is a view for explaining a rotational alignment accuracy in a rough alignment step and a fine alignment step as a modification of an alignment operation between two MCFs in which each core arrangement has rotational symmetry. In the rough alignment step in the example of FIG. 10, rough alignment is performed using the positional relationship between marker 111 and any one of cores #1 to #4. The core arrangement of each of the left-side MCF 10 and the right-side MCF 10 shown in FIG. 10 has a four core arrangement formed of core #1 to core #4 and also fourfold rotational symmetry, similarly to the example shown in the lower part of FIG. 8. In the left side of FIG. 10, light source 140C and camera 100 are arranged so as to sandwich the left-side MCF 10 as a device configuration at the time of side-surface observation (fine alignment step). The left-side MCF 10 is fixed as an alignment target. In addition, line L shown in FIG. 10 is a straight line (first line) extending from the center of the end surface (point which fiber axis AX passes through) as a starting point so as to pass through the center of a specific core in the case of the left-side MCF 10, and indicates orientation indicating core arrangement in the left-side MCF 10 which is an alignment target. Similarly, in the case of the right-side MCF 10, it is a straight line (second line) extending from the center of the end surface (point which fiber axis AX passes through) as a starting point so as to pass through the center of a specific core, and indicates an orientation indicating the core arrangement in the right-side MCF 10 which is a to-be-aligned object.

In FIG. 10, the left side shows the end surface of the left-side MCF 10 (alignment target) which is roughly aligned so that marker 111 and core #4 overlap each other along the side-surface observation direction. In addition, in FIG. 10, the end surface of the right-side MCF 10 (to-be-aligned object) roughly aligned so that marker 111 and core #4 overlap along the side-surface observation direction is shown in the center, and the end surface of the right-side MCF 10 (to-be-aligned object) roughly aligned so that marker 111 and core #1 overlap along the side-surface observation direction is shown on the right. It is noted that, also in the example of FIG. 10, core #1 to core #4 and marker 111 are covered with the common cladding on the end surface of each of the left-side MCF 10 and the right-side MCF 10, and the allowable range in the rough alignment step (rotatable range in the fine alignment step) is set in the measurement sub step in the rough alignment step. Since the four core arrangement has fourfold rotational symmetry, it has a rotation period of 90° (=360°/4).

In the example of FIG. 10, the right-side MCF 10 shown at the center is roughly aligned so that marker 111 overlaps core #4 along the side-surface observation direction, similarly to the left-side MCF 10 which is the alignment target. Here, the cross-sectional size of marker 111 is smaller than the cross-sectional size of any of the cores from core #1 to core #4. For this reason, the core arrangement on the end surface of the left-side MCF 10 and the core arrangement on the end surface of the right-side MCF 10 do not always completely coincide with each other. Therefore, in the fine alignment step following the rough alignment step, the right-side MCF 10 (the center part) is fine-aligned by a rotation angle corresponding to the core diameter (substantially error-corrected). This rotation angle (correction range) falls within an allowable range in the rough alignment step (rotatable range in the fine alignment step), and to be specific, is equal to or less than a rotation period (=90°) obtained from the core arrangement of each of the left-side MCF 10 and the right-side MCF 10. Similarly, in the example of FIG. 10, unlike the left-side MCF 10 which is the alignment target, the right-side MCF 10 shown on the right side is roughly aligned so that marker 111 overlaps core #1 along the side-surface observation direction. In this case, in the fine alignment step following the rough alignment step, a rotation angle for rotational alignment is determined within a maximum angle range (rotation period of the core arrangement) of −90° to +90° around a rotation angle of 0°

(orientation indicating the core arrangement of the left-side MCF 10). It is noted that even when marker 111 is roughly aligned so as to overlap core #2 or core #3 along the side-surface observation direction, in the fine alignment step, the rotation angle for the rotational alignment is determined within the maximum angle range (rotation period of the core alignment) of −90° to +90° around the rotation of angle 0° as the center.

Here, in a general alignment operation, after highly accurate alignment is performed in step ST2 of the above-described steps ST1 to ST4, step ST3 and step ST4 are subsequently performed. In this case, since a highly accurate and complicated observation and driving system is required, it is difficult to achieve sufficient alignment accuracy by using a driving system which is easily available and has a simple structure. For example, from step ST1 to step ST3 described above, a driving system capable of driving the position of mirror 900 with high reproducibility is required. In addition, in step ST4, a driving system is also required to precisely move the two optical fibers that have been aligned in step ST2 (alignment in the x-axis direction, alignment in the y-axis direction, and rotation about fiber axis AX) so that the alignment state of the cores of the two optical fibers does not change. On the other hand, in the optical fiber alignment method of the present disclosure, first, in the rough alignment step from step ST1 to step ST3 described above, the alignment by end-surface observation is limited to rough alignment, and then in the fine alignment step of step ST5, fine alignment by side-surface observation is performed. Thereby, the accuracy required for the control of the driving system in the rough alignment step (end-surface observation) is eased.

Figure 11:
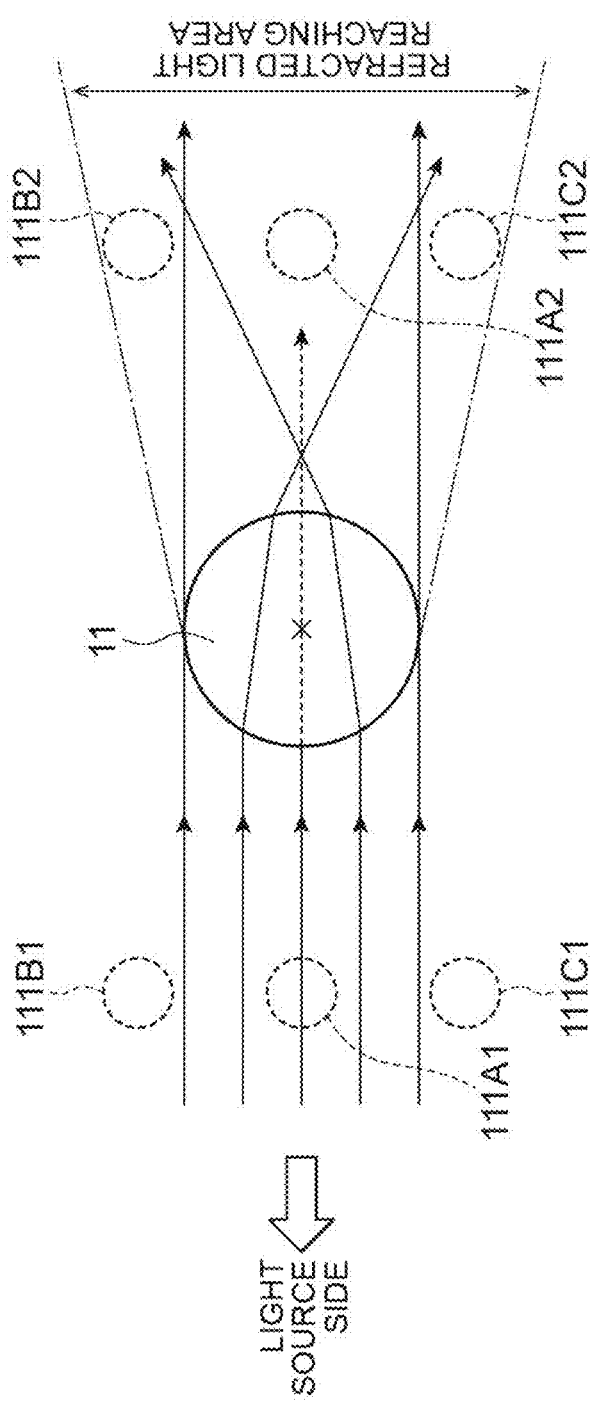
FIG. 11 is a view for explaining a specific case in which make marker detection difficult.

According to the optical fiber alignment method of the present disclosure, in addition to the easing of the required accuracy for the driving system control as described above, by the alignment combining the end-surface observation and the side-surface observation, the alignment including the position of the marker can be performed with high accuracy. In a general MCF, the number of markers is smaller than the number of cores, and the size of the refractive index change region is often designed to be smaller than each core. Therefore, as cases where the marker cannot be detected at the time of side-surface observation, for example, depending on the positional relationship between the MCF and the camera, a case where the marker is in the shadow of the core (case 1) and a case where light due to refraction at the core and light due to refraction at the marker are measured by the same observation pixel of the camera (case 2) can be considered. In such a case, the light refracted by the marker becomes weak and is buried in the light refracted by the core, and thus cannot be detected. In general, when alignment is performed in a state in which marker detection cannot be performed, cores different from an intended core are connected to each other due to marker mismatch, and re-fusion is required. It is noted that, FIG. 11 is a view for explaining a specific case in which make marker detection difficult as described above. That is, the case 1 above shows the marker in the shadow of core 11, with the marker being arranged at a circle 111A1 or a circle 111A2, indicated by the dashed line, with respect to core 11. On the other hand, the case 2 indicates a state in which the marker is arranged at a circle 111B1, a circle 111B2, a circle 111C1, or a circle 111C2 indicated by the dashed line with respect to core 11, so that the refracted light from the marker reaches the refracted light reaching area (observation pixel area) of the camera where the refracted light from core 11 is measured. However, the optical fiber alignment method of the present disclosure makes it possible to avoid this marker mismatch. First, the marker and the core between the two optical fibers are aligned to an approximately matched state in the rough alignment step by the end-surface observation, and the fine alignment step by the side-surface observation is performed from the state, so that even when the marker cannot be detected in the fine alignment step, the marker positions between the two optical fibers can be inevitably aligned by aligning the corresponding end surface elements between the two optical fibers tomatch based on the side surface image acquired after the rough alignment.

For the above reasons, in the optical fiber alignment method of the present disclosure, in order to ensure stable alignment accuracy, in the primary rotating sub step of the rough alignment step, the optical fiber to be aligned can be rotated to a position where a side surface image in a state where light refracted by the core and light refracted by the marker are measured by different pixels of the camera or a side surface image in a state where any of the plurality of cores and the marker overlap each other is intentionally acquired in the secondary image obtaining sub step (improvement in accuracy of core detection and alignment in the fine alignment step).

The alignment apparatus and connection device using the optical fiber alignment method of the present disclosure may be combined with the coarse alignment step under both the first and second conditions described above. That is, the above description includes the following additional features. In the example described above, the rough alignment unit and the fine alignment unit described in Appendix 1 below are described as same alignment mechanisms 130A and 130B, but may be different components.

Appendix 1

An optical fiber alignment device configured to select, as to-be-aligned objects, a first optical fiber extending along a first central axis and including a plurality of first cores arranged at predetermined positions on a first end surface perpendicular to the first central axis and a second optical fiber extending along a second central axis and including a plurality of second cores arranged at positions on a second end surface perpendicular to the second central axis, the positions corresponding to the predetermined positions on the first end surface, or select the second optical fiber as a to-be-aligned object and configured to align the first and second optical fibers such that the first and second optical fibers are optically connected to each other, the optical fiber alignment device comprising:

a rough alignment unit (alignment mechanism 130A, 130B) configured to roughly align the first and second optical fibers based on a result of end-surface observation performed on the first and second optical fibers; and a fine alignment unit (alignment mechanism 130A, 130B) configured to finely align the first and second optical fibers based on a result of side-surface observation performed on the first and second optical fibers in such a manner as to increase an optical coupling efficiency between each pair of the cores in the first and second optical fibers, which have been roughly aligned by the rough alignment unit, the pair of cores being associated with each other, wherein the rough alignment unit includes a first image obtaining unit (camera 100) configured to obtain an end surface image of the first optical fiber and an end surface image of the second optical fiber, a measurement unit (control unit 120) configured to measure, from the end surface images of the first and second optical fibers, a dimension of each of the plurality of first and second cores and a position of a center of each of the plurality of first and second cores as information relating to a first core arrangement formed of the plurality of first cores on the first end surface and information relating to a second core arrangement formed of the plurality of second cores on the second end surface, and a first rotation unit (alignment mechanism 130A, 130B) configured to rotate, based on a measurement result obtained by the measurement unit, the to-be-aligned object along a circumferential direction around a central axis of the to-be-aligned object, wherein the fine alignment unit includes a second image obtaining unit (camera 100) configured to obtain a side surface image of the first and second optical fibers, and a second rotation unit (alignment mechanism 130A, 130B) configured to check an alignment state between the first and second optical fibers, which have been roughly aligned, from the side surface image and rotate the to-be-aligned object along the circumferential direction around the central axis of the to-be-aligned object, wherein the first rotation unit rotates, under a first condition in which both the first core arrangement and the second core arrangement have n-fold (n is two or more) rotational symmetry, the first and second optical fibers such that a first angle formed by an orientation indicated by a first line, the first line being defined on the first end surface and extending from a center of the first end surface in such a manner as to pass through the center of a specific one of the plurality of first cores, and an orientation indicated by a second line, the second line being defined on the second end surface and extending from a center of the second end surface in such a manner as to pass through the center of a specific one of the plurality of second cores that is associated with the specific first core is 360°/n or less, and wherein the first rotation unit rotates, under a second condition in which neither the first core arrangement nor the second core arrangement has rotational symmetry, the first and second optical fibers such that a second angle formed by an orientation indicated by the first line and an orientation indicated by the second line is a minimum angle or less, the minimum angle being an angle other than zero among angles formed by a plurality of first radial line elements defined on the first end surface and extending radially from the center of the first end surface in such a manner as to pass through the centers of the plurality of first cores or angles formed by a plurality of second radial line elements defined on the second end surface and extending radially from the center of the second end surface in such a manner as to pass through the centers of the plurality of second cores.

Appendix 2

A connection device for optical fibers, which are aligned in such a manner as to be optically connected to each other, configured to select, as to-be-aligned objects, a first optical fiber extending along a first central axis and including a plurality of first cores arranged at predetermined positions on a first end surface perpendicular to the first central axis and a second optical fiber extending along a second central axis and including a plurality of second cores arranged at positions on a second end surface perpendicular to the second central axis, the positions corresponding to the predetermined positions on the first end surface, or select the second optical fiber as a to-be-aligned object and configured to align the first and second optical fibers such that the first and second optical fibers are optically connected to each other, the connection device comprising:

a rough alignment unit (alignment mechanism 130A, 130B) configured to roughly align the first and second optical fibers based on a result of end-surface observation performed on the first and second optical fibers;

a fine alignment unit (alignment mechanism 130A, 130B) configured to finely align the first and second optical fibers based on a result of side-surface observation performed on the first and second optical fibers in such a manner as to increase an optical coupling efficiency between each pair of the cores in the first and second optical fibers, which have been roughly aligned by the rough alignment unit, the pair of cores being associated with each other; and a fixation jig for maintaining an alignment state between the first and second optical fiber established by the rough alignment unit and the fine alignment unit, wherein the rough alignment unit includes a first image obtaining unit (camera 100) configured to obtain an end surface image of the first optical fiber and an end surface image of the second optical fiber, a measurement unit (control unit 120) configured to measure, from the end surface images of the first and second optical fibers, a dimension of each of the plurality of first and second cores and a position of a center of each of the plurality of first and second cores as information relating to a first core arrangement formed of the plurality of first cores on the first end surface and information relating to a second core arrangement formed of the plurality of second cores on the second end surface, and a first rotation unit (alignment mechanism 130A, 130B) configured to rotate, based on a measurement result obtained by the measurement unit, the to-be-aligned object along a circumferential direction around a central axis of the to-be-aligned object, wherein the fine alignment unit includes a second image obtaining unit (camera 100) configured to obtain a side surface image of the first and second optical fibers, and a second rotation unit (alignment mechanism 130A, 130B) configured to check an alignment state between the first and second optical fibers, which have been roughly aligned, from the side surface image and rotate the to-be-aligned object along the circumferential direction around the central axis of the to-be-aligned object, wherein the first rotation unit rotates, under a first condition in which both the first core arrangement and the second core arrangement have n-fold (n is two or more) rotational symmetry, the first and second optical fibers such that a first angle formed by an orientation indicated by a first line, the first line being defined on the first end surface and extending from a center of the first end surface in such a manner as to pass through the center of a specific one of the plurality of first cores, and an orientation indicated by a second line, the second line being defined on the second end surface and extending from a center of the second end surface in such a manner as to pass through the center of a specific one of the plurality of second cores that is associated with the specific first core is 360°/n or less, and wherein the first rotation unit rotates, under a second condition in which neither the first core arrangement nor the second core arrangement has rotational symmetry, the first and second optical fibers such that a second angle formed by an orientation indicated by the first line and an orientation indicated by the second line is a minimum angle or less, the minimum angle being an angle other than zero among angles formed by a plurality of first radial line elements defined on the first end surface and extending radially from the center of the first end surface in such a manner as to pass through the centers of the plurality of first cores or angles formed by a plurality of second radial line elements defined on the second end surface and extending radially from the center of the second end surface in such a manner as to pass through the centers of the plurality of second cores.

REFERENCE SIGNS LIST

10 MCF (multi-core optical fiber)
11, 321, #1 to #8 core
12 common cladding
13, 320 glass fiber
14 resin coating
322 cladding
30 bundle fiber
31 housing
31A front end surface
31B rear end surface
32 single-core optical fiber
33 front opening
34 accommodation space
50, 50A temporary fixation mechanism
51, 71, 81, 510 lower member
52, 72, 82, 520 upper member
55A, 55B discharge electrode
56 fusion portion
57 guide groove
51a, 52a, 510a, 520a contact surface
51b, 710 V-shaped groove
81a, 82a, 510b, 520b groove
53, 530 hinge
60 ferrule
61 ferrule end surface
62 sleeve
70 fiber array
73 guide member
75 joint portion
76 adhesive (ultraviolet-ray-curing resin)
80 mechanical splice element
100 camera
100A end surface image
100B side surface image
100C luminance distribution
110 memory
111 marker
120 control unit
130, 130A, 130B alignment mechanism
131 driving unit
132 holding member
133 rotary shaft 140A, 140B, 140C light source
550 discharge unit
800 XYZ stage
800A Z-axis stage
800B Y-axis stage
800C X-axis stage
810 XYZ stage driving unit
900 mirror
910 mirror driving unit
920 support shaft
A fixation side
B alignment side
AX fiber axis (central axis)
L line
L1 to L4 radial line element
S1 to S8 arrow

What is claimed is:

1. An optical fiber alignment method for selecting, as to-be-aligned objects, a first optical fiber extending along a first central axis and including a plurality of first cores arranged at predetermined positions on a first end surface perpendicular to the first central axis and a second optical fiber extending along a second central axis and including a plurality of second cores arranged at positions on a second end surface perpendicular to the second central axis, the positions corresponding to the predetermined positions on the first end surface, or selecting the second optical fiber as a to-be-aligned object and aligning the first and second optical fibers such that the first and second optical fibers are optically connected to each other, the method comprising:

roughly aligning the first and second optical fibers based on a result of end-surface observation performed on the first and second optical fibers; and finely aligning the first and second optical fibers based on a result of side-surface observation performed on the first and second optical fibers in such a manner as to increase an optical coupling efficiency between each pair of the cores in the first and second optical fibers, which have been roughly aligned, the pair of cores being associated with each other, wherein the roughly aligning includes primarily obtaining an end surface image of the first optical fiber and an end surface image of the second optical fiber, measuring, from the end surface images of the first and second optical fibers, a dimension of each of the plurality of first and second cores and a position of a center of each of the plurality of first and second cores as information relating to a first core arrangement formed of the plurality of first cores on the first end surface and information relating to a second core arrangement formed of the plurality of second cores on the second end surface, and primarily rotating, based on a result of the measuring, the to-be-aligned object along a circumferential direction around a central axis of the to-be-aligned object, wherein the finely aligning includes secondarily obtaining a side surface image of the first and second optical fibers, and secondarily rotating the to-be-aligned object along the circumferential direction around the central axis of the to-be-aligned object after checking an alignment state between the first and second optical fibers, which have been roughly aligned, from the side surface image, and wherein, in the primarily rotating, the first and second optical fibers are roughly aligned such that, under a first condition in which both the first core arrangement and the second core arrangement have n-fold (n is two or more) rotational symmetry, a first angle formed by an orientation indicated by a first line, the first line being defined on the first end surface and extending from a center of the first end surface in such a manner as to pass through the center of a specific one of the plurality of first cores, and an orientation indicated by a second line, the second line being defined on the second end surface and extending from a center of the second end surface in such a manner as to pass through the center of a specific one of the plurality of second cores that is associated with the specific first core is 360° /n or less or such that, under a second condition in which neither the first core arrangement nor the second core arrangement has rotational symmetry, a second angle formed by an orientation indicated by the first line and an orientation indicated by the second line is a minimum angle or less, the minimum angle being an angle other than zero among angles formed by a plurality of first radial line elements defined on the first end surface and extending radially from the center of the first end surface in such a manner as to pass through the centers of the plurality of first cores or angles formed by a plurality of second radial line elements defined on the second end surface and extending radially from the center of the second end surface in such a manner as to pass through the centers of the plurality of second cores.

2. The optical fiber alignment method according to claim 1, the method further comprising:

moving, before the finely aligning, at least the second optical fiber, which has been roughly aligned, along the second central axis such that a gap between the first end surface of the first optical fiber, which has been roughly aligned, and the second end surface of the second optical fiber, which has been roughly aligned, is reduced.

3. The optical fiber alignment method according to claim 1, wherein, in both the roughly aligning and the finely aligning or in either the roughly aligning or the finely aligning, the first core arrangement on the end surface of the first optical fiber is fixed as an alignment target.

4. The optical fiber alignment method according to claim 1, wherein, in the measuring, a rotation period defining the rotational symmetry of the first core arrangement on the first end surface and a rotation period defining the rotational symmetry of the second core arrangement on the second end surface are measured, and wherein rotational alignment in the secondarily rotating is performed by rotating the to-be-aligned object at a rotation angle that is the first angle after the primarily rotating or less or the second angle after the primarily rotating or less.

5. The optical fiber alignment method according to claim 1, wherein the first optical fiber includes a first marker extending along the first central axis, and the second optical fiber includes a second marker extending along the second central axis, and wherein, in the primarily rotating, the to-be-aligned object is rotated to a position where the side surface image in which one of the plurality of first cores and the first marker overlap each other and in which one of the plurality of second cores and the second marker overlap each other is obtained in the secondarily obtaining.

6. The optical fiber alignment method according to claim 1, wherein the first and second optical fibers are each a multi-core optical fiber or a bundle fiber.

7. An alignment device for performing the optical fiber alignment method according to claim 1.

8. A connection device comprising: a fusion device configured to heat and fuse the first and second optical fibers together in a state where the first end surface of the first optical fiber aligned by the alignment device according to claim 7 and the second end surface of the second optical fiber aligned by the alignment device according to claim 7 are abutted against each other.

9. A connection device comprising: a fixation jig configured to fix the first and second optical fibers in place in a state where the first end surface of the first optical fiber aligned by the alignment device according to claim 7 and the second end surface of the second optical fiber aligned by the alignment device according to claim 7 face each other.

10. The connection device according to claim 9, wherein the fixation jig is a mechanical splice element.

* * * * *